US007912298B2

(12) United States Patent
Kato et al.

(10) Patent No.: US 7,912,298 B2
(45) Date of Patent: Mar. 22, 2011

(54) VIDEO EVALUATION DEVICE, FRAME RATE DETERMINATION DEVICE, VIDEO PROCESS DEVICE, VIDEO EVALUATION METHOD, AND VIDEO EVALUATION PROGRAM

(75) Inventors: Sadaatsu Kato, Yokosuka (JP); Choong Seng Boon, Yokohama (JP); Tsutomu Horikoshi, Kamakura (JP)

(73) Assignee: NTT DoCoMo, Inc., Tokyo (JP)

( * ) Notice: Subject to any disclaimer, the term of this patent is extended or adjusted under 35 U.S.C. 154(b) by 1549 days.

(21) Appl. No.: 11/226,317

(22) Filed: Sep. 15, 2005

(65) Prior Publication Data
US 2006/0056515 A1 Mar. 16, 2006

(30) Foreign Application Priority Data

Sep. 16, 2004 (JP) ................ P2004-270123
Aug. 8, 2005 (JP) ................ P2005-229618

(51) Int. Cl.
*G06K 9/36* (2006.01)
*H04N 11/02* (2006.01)
*G06K 9/46* (2006.01)

(52) U.S. Cl. ................ 382/232; 375/240.16
(58) Field of Classification Search ............ 382/162, 382/164, 165, 167, 254, 305; 375/240.01, 375/240.12, 240.14, 240.15, 240.16, E7.027, 375/E7.076, E7.093, E7.202; 348/155, 207.1, 348/239, 415.1, 416.1, 451, 469, 699, 700, 348/E5.066; 358/1.1, 1.9, 515, 537
See application file for complete search history.

(56) References Cited

U.S. PATENT DOCUMENTS

| | | | | |
|---|---|---|---|---|
| 4,668,986 A | * | 5/1987 | Furukawa | 348/416.1 |
| 4,849,807 A | * | 7/1989 | Music et al. | 375/240.01 |
| 4,924,305 A | * | 5/1990 | Nakagawa et al. | 348/451 |
| 5,096,286 A | * | 3/1992 | Weisgerber | 352/40 |
| 5,262,856 A | * | 11/1993 | Lippman et al. | 375/240.12 |
| 5,592,226 A | * | 1/1997 | Lee et al. | 375/240.14 |

(Continued)

FOREIGN PATENT DOCUMENTS

JP 60-55487 3/1985
(Continued)

OTHER PUBLICATIONS

Byung Cheol Song, et al., "A Virtual Frame Rate Control Algorithm for Efficient MPEG-2 Video Encoding", IEEE Transactions on Consumer Electronics, vol. 49, No. 2, XP-002361724, May 2003, pp. 460-465.
Hwangjun Song, et al., "A Sliding Window Approach to Real-time H.263+Frame Rate Adjustment", Signals, Systems & Computer, vol. 1, XP-010324274, Nov. 1, 1998, pp. 860-864.

(Continued)

*Primary Examiner* — Amir Alavi
(74) *Attorney, Agent, or Firm* — Oblon, Spivak, McClelland, Maier & Neustadt, L.L.P.

(57) ABSTRACT

A frame rate is determined in accordance with the smoothness in movement of a video. An amount of change detection section extracts an amount of change based on a plurality of frame pictures included in an input video signal input as a moving picture signal from the outside and outputs an amount of change to an evaluation value calculation section. The evaluation value calculation section computes an amount of change in time between each of the frame pictures based on the amount of change and the time interval between frame pictures based on frame rate information and evaluates an evaluation value for evaluating the smoothness in movement of an input video based on the amount of change in time. The evaluation value is output to the outside as a factor for determining a frame rate.

14 Claims, 18 Drawing Sheets

U.S. PATENT DOCUMENTS

| | | | |
|---|---|---|---|
| 5,786,859 A * | 7/1998 | Ueno et al. | 375/240.15 |
| 5,801,765 A * | 9/1998 | Gotoh et al. | 348/155 |
| 5,990,955 A * | 11/1999 | Koz | 375/240.01 |
| 6,519,046 B1 * | 2/2003 | Kinjo | 358/1.1 |
| 6,834,080 B1 | 12/2004 | Furukawa et al. | |
| 2003/0169933 A1 | 9/2003 | Song et al. | |
| 2005/0237380 A1 * | 10/2005 | Kakii et al. | 348/14.12 |
| 2006/0056515 A1 * | 3/2006 | Kato et al. | 375/240.16 |
| 2010/0118935 A1 * | 5/2010 | Kakii et al. | 375/240.01 |

FOREIGN PATENT DOCUMENTS

| | | |
|---|---|---|
| JP | 10-232894 | 9/1998 |
| JP | 10-307947 | 11/1998 |
| JP | 11-112940 | 4/1999 |

OTHER PUBLICATIONS

Feng Pan, et al., "Content Adaptive Frame Skipping for Low Bit Rate Video Coding", ICICS-PCM 2003, vol. 1, XP-010702581, Dec. 15, 2003, pp. 230-234.

Japanese Office Action mailed Nov. 21, 2006 with English translation (5 pages).

Toshiyuki Yoshida, et al. "Adaptive Control of Frame Intervals for Image Sequences based on Statistics of Motion Vectors", General Conference 2004 of the Institute of Electronics, Information and Communication Engineers, D-11-46, Mar. 8, 2004. 6 pages (With English Translation).

European Search Report issued Nov. 3, 2010, in European Patent Application No. 09170074.0.

* cited by examiner

Fig.16
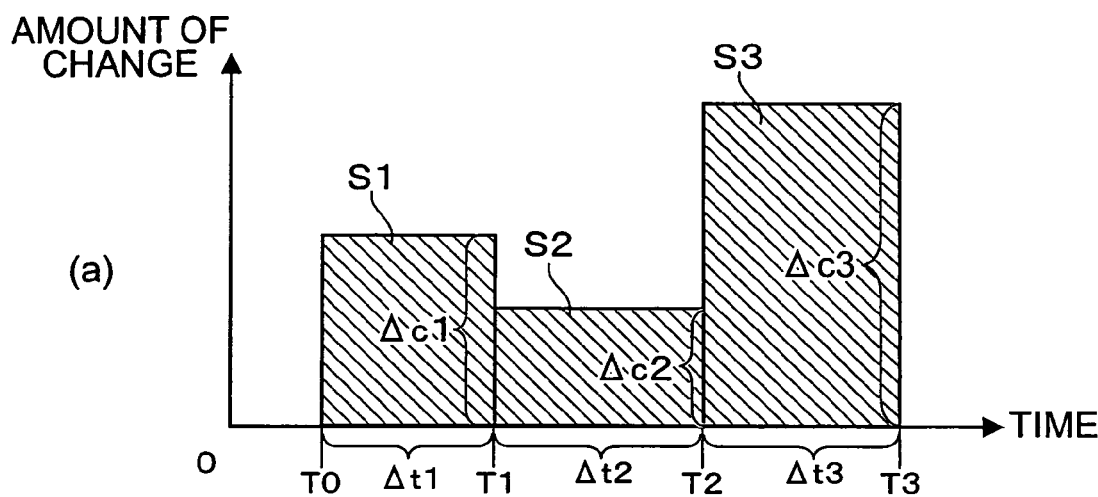
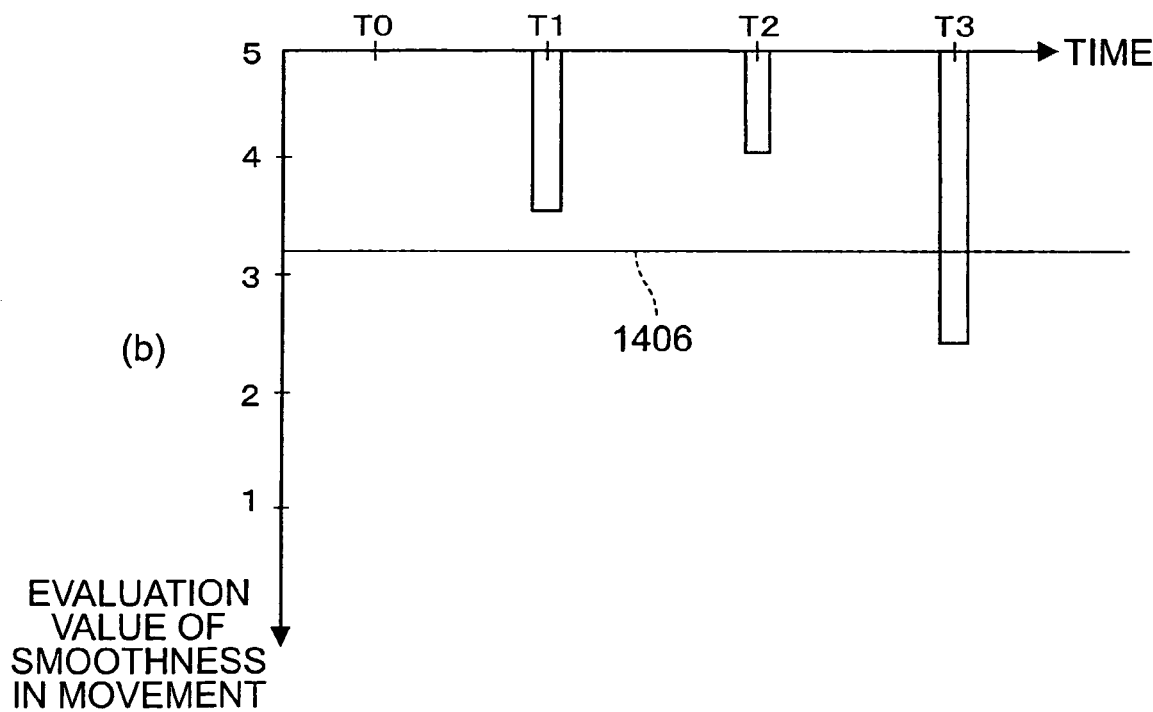

VIDEO EVALUATION DEVICE, FRAME RATE DETERMINATION DEVICE, VIDEO PROCESS DEVICE, VIDEO EVALUATION METHOD, AND VIDEO EVALUATION PROGRAM

BACKGROUND OF THE INVENTION

1. Field of the Invention

The present invention relates to video evaluation device, frame rate determination device, video process device, a video evaluation method, and a video evaluation program.

2. Related Background of the Invention

In a video process including acquisition, storing, transmission, displaying, encoding, decoding, etc. of a video, in general, the process is carried out on the basis of a fixed frame rate. Here, the frame rate is the number of frames processed per second. The fixed frame rate is the frame rate at which the number of frames processed per second is constant. As a concrete example of the fixed frame rate is defined as 29.97 fps (frame per second) according to, for example, National Television Standards Committee (NTSC) standards adopted in the United States and Japan. Alternatively, it is defined as 25 fps according to Phase Alternating Line (PAL) standards of National Television Standards Committee adopted in Europe. Further, the fixed frame rate of 15 fps or 24 fps may be used. A "video" is composed of successive "frame pictures", which are individual still pictures.

When a video process is carried out at a fixed frame rate, if the frame rate is increased, the time intervals between successive frames become shorter. Due to this, it becomes possible to process a video smoother in movement. For example, a video to be processed at a frame rate of 30 fps has the number of frames per unit time larger than that of a video to be processed at a frame rate of 15 fps, therefore, the movement of the video is represented in a finer manner and a smoother movement is represented as a whole.

In addition to the video process at the above-mentioned fixed frame rate, a video process at a variable frame rate is also carried out. In the video process at a variable frame rate, the frame rate is varied in accordance with the amount of process of a video and the amount of data. For example, when a video is encoded, if it is judged that the amount of data to be encoded is large, the frame rate is reduced and the number of frames to be encoded per unit time is reduced. This is because if the amount of data increases, the time required for video process is increased. Here, at a variable frame rate, if the time interval between successive frame pictures is assumed to be T, the frame rate between two frame pictures is 1/T.

A technique to change such a frame rate is disclosed in, for example, Patent document 1 (Japanese Patent Application Laid-open No. Hei 11-112940).

SUMMARY OF THE INVENTION

By the way, when a video is processed at a fixed frame rate, if the frame rate is increased in order to realize a smooth movement, the amount of process, the amount of data, and the power consumption accompanying the video process increase. This is explained specifically. For example, when a video is acquired, if the number of frames to be acquired per unit time increases, the amount of process and the power consumption accompanying the process increase. Further, when a video is stored, the amount of data increases because the number of frames to be stored per unit time increases.

On the other hand, if the frame rate is reduced in order to reduce the amount of process, the amount of data, and the power consumption accompanying the process of a video, the smoothness in movement of a video is degraded, resulting in a video with unsmooth movement.

When a video is processed at a variable frame rate, if the frame rate is changed in accordance with only the amount of process and the amount of data of the video, the smoothness in movement of the video is degraded, resulting in a video with unsmooth movement.

As described above, if the frame rate is changed without taking into consideration the feature of movement of a video, there arises a problem that the amount of process, the amount of data, and the power consumption are required more than necessary and that a video with unsmooth movement results.

In order to solve the above-mentioned problem, an object of the present invention is to provide video evaluation device, frame rate determination device, video process device, a video evaluation method, a frame rate determination method, a video process method, a video evaluation program, a frame rate determination program, and a video process program for determining a frame rate in accordance with the smoothness in movement of a video.

The video evaluation device of the present invention is characterized by comprising an amount of change detection means for detecting an amount of change that indicates the degree of change between each frame picture based on a plurality of frame pictures included in an input video signal and an evaluation value calculation means for calculating an evaluation value relating to the smoothness in movement of an input video signal based on the amount of change and the time interval between each frame picture and outputting it to the outside.

The video evaluation method of the present invention is characterized by comprising an amount of change detection step for detecting an amount of change that indicates the degree of change between each frame picture based on a plurality of frame pictures included in an input video signal and an evaluation value calculation step for calculating an evaluation value relating to the smoothness in movement of an input video signal based on the amount of change and the time interval between each frame picture and outputting it to the outside.

Further, the video evaluation program of the present invention is characterized by causing a computer to function as an amount of change detection means for detecting an amount of change that indicates the degree of change between each frame picture based on a plurality of frame pictures included in an input video signal and as an evaluation value calculation means for calculating an evaluation value relating to the smoothness in movement of an input video signal based on the amount of change and the time interval between each frame picture and outputting it to the outside.

According to the invention described above, the amount of change is detected based on the plurality of frame pictures included in the input video signal and the evaluation value for evaluating the smoothness in movement of the input video signal is calculated based on the amount of change and the time interval between each frame picture. Therefore, it is possible to evaluate the smoothness in movement of a video at a frame rate during the period of video process in accordance with the amount of change of the input video signal input at a predetermined frame rate. Further, since the evaluation value obtained by the evaluation is output to the outside, it becomes possible to determine a frame rate based on the evaluation value. In other words, it is possible to determine a frame rate in accordance with the smoothness in movement of a video.

In the video evaluation device of the present invention, it is preferable for the above-mentioned evaluation value calculation means to compute the amount of change in time in accordance with the amount of change and the time interval between each frame picture based on the amount of change and the time interval between each frame picture and calculate an evaluation value using the amount of change in time. With this, it is possible to calculate an evaluation value that takes into consideration the amount of change in time computed in accordance with the amount of change and the time interval calculated between each frame picture.

In the video evaluation device of the present invention, it is preferable for the above-mentioned amount of change to be a value based on the difference in luminance value between each frame picture, or a movement vector between each frame picture. With this, it is possible to calculate an evaluation value based on the difference in luminance value between each frame picture or the movement vector between each frame picture.

In the video evaluation device of the present invention, it is preferable to further comprise a feature value calculation means for calculating a movement feature value that indicates the feature of movement of an input video signal based on the above-mentioned amount of change, and for the above-mentioned evaluation value calculation means to calculate an evaluation value based on the movement feature value and the time interval between each frame picture. With this, it is possible to calculate an evaluation value that takes into consideration the movement feature value that indicates the feature of the movement of the input video signal.

In the video evaluation device of the present invention, it is preferable for the above-mentioned evaluation value calculation means to compute the amount of change in time in accordance with the amount of change and the time interval between each frame picture based on the movement feature value and the time interval between each frame picture and calculate an evaluation value using the amount of change in time. With this, it is possible to calculate an evaluation value that takes into consideration the amount of change in time in accordance with the amount of change and the time interval between each frame picture.

In the video evaluation device of the present invention, it is preferable for the above-mentioned amount of change to be a movement vector between each frame picture and for the above-mentioned movement feature value to be a value calculated based on the magnitude of the movement vector. With this, it is possible to calculate an evaluation value based on the magnitude of the movement vector between each frame.

The frame rate determination device of the present invention is characterized by comprising a frame rate generation means for generating a first frame rate, an amount of change detection means for detecting an amount of change that indicates the degree of change between each frame picture based on a plurality of frame pictures included in an input video signal, an evaluation value calculation means for calculating an evaluation value relating to the smoothness in movement of an input video signal based on the amount of change and the time interval between each frame picture corresponding to the first frame rate, and a frame rate determination means for determining a second frame rate for carrying out the process of an input video signal using the evaluation value and outputting it to the outside.

The frame rate determination method of the present invention is characterized by comprising a frame rate generation step for generating a first frame rate, an amount of change detection step for detecting an amount of change that indicates the degree of change between each frame picture based on a plurality of frame pictures included in an input video signal, an evaluation value calculation step for calculating an evaluation value relating to the smoothness in movement of an input video signal based on the amount of change and the time interval between each frame picture corresponding to the first frame rate, and a frame rate determination step for determining a second frame rate for carrying out the process of an input video signal using the evaluation value and outputting it to the outside.

Further, the frame rate determination program of the present invention is characterized by causing a computer to function as a frame rate generation means for generating a first frame rate, an amount of change detection means for detecting an amount of change that indicates the degree of change between each frame picture based on a plurality of frame pictures included in an input video signal, an evaluation value calculation means for calculating an evaluation value relating to the smoothness in movement of an input video signal based on the amount of change and the time interval between each frame picture corresponding to the first frame rate, and a frame rate determination means for determining a second frame rate for carrying out the process of an input video signal using the evaluation value and outputting it to the outside.

According to the present invention described above, the amount of change is detected based on the plurality of frame pictures included in the input video signal, the evaluation value for evaluating the smoothness in movement of the input video signal is calculated based on the amount of change and the time interval between each frame picture corresponding to the first frame rate, and the second frame rate for carrying out the process of the input video signal is determined using the evaluation value. In other words, in accordance with the amount of change of the input video signal input according to the first frame rate, the smoothness in movement of the video at the first frame rate is evaluated and at the same time, the second frame rate is determined using the evaluation. Therefore, it is possible to read the input video signal at the second frame rate determined in accordance with the evaluation of the smoothness in movement of the video. In other words, it is possible to determine a frame rate of an input video signal in accordance with the smoothness in movement of a video and at the same time, to read the input video signal while maintaining the smoothness in movement of the video.

In the frame rate determination device of the present invention, it is preferable for the above-mentioned frame rate determination means to set the second frame rate smaller than the first frame rate when the evaluation value is greater than a predetermined set value and to set the second frame rate greater than the first frame rate when the evaluation value is smaller than the predetermined set value by comparing the evaluation value with the predetermined set value. With this, it is possible to determine the second frame rate that is considered such that the evaluation value for evaluating the smoothness in movement of a video falls within a predetermined evaluation criterion range. In other words, it is possible to read the input video signal while keeping the smoothness in movement of a video within a predetermined criterion range.

The video process device of the present invention is characterized by comprising a buffer means for storing an input video signal, a frame rate generation means for generating a first frame rate, an amount of change detection means for detecting an amount of change that indicates the degree of change between each frame picture based on a plurality of frame pictures included in the input video signal, an evaluation value calculation means for calculating an evaluation value relating to the smoothness in movement of an input video signal based on the amount of change and the time interval between each frame picture corresponding to the first frame rate, a frame rate determination means for determining a second frame rate for carrying out the process of an input video signal using the evaluation value, and a video process means for reading the input video signal stored in the buffer means using the second frame rate and carrying out the video process.

The video process method of the present invention is characterized by comprising a buffer step for storing an input video signal, a frame rate generation step for generating a first frame rate, an amount of change detection step for detecting an amount of change that indicates the degree of change between each frame picture based on a plurality of frame pictures included in the input video signal, an evaluation value calculation step for calculating an evaluation value relating to the smoothness in movement of an input video signal based on the amount of change and the time interval between each frame picture corresponding to the first frame rate, a frame rate determination step for determining a second frame rate for carrying out the process of an input video signal using the evaluation value, and a video process step for reading the input video signal stored in the buffer means using the second frame rate and carrying out the video process.

Further, the video process program of the present invention is characterized by causing a computer to function as a buffer means for storing an input video signal, a frame rate generation means for generating a first frame rate, an amount of change detection means for detecting an amount of change that indicates the degree of change between each frame picture based on a plurality of frame pictures included in the input video signal, an evaluation value calculation means for calculating an evaluation value relating to the smoothness in movement of an input video signal based on the amount of change and the time interval between each frame picture corresponding to the first frame rate, a frame rate determination means for determining a second frame rate for carrying out the process of an input video signal using the evaluation value, and a video process means for reading the input video signal stored in the buffer means using the second frame rate and carrying out the video process.

According to the present invention described above, the amount of change is detected based on the plurality of frame pictures included in the input video signal, the evaluation value for evaluating the smoothness in movement of the input video signal is calculated based on the amount of change and the time interval between each frame picture corresponding to the first frame rate, and the second frame rate for carrying out the process of the input video signal is determined using the evaluation value. Further, the video process of the input video signal is carried out using the second frame rate. In other words, in accordance with the amount of change of the input video signal input according to the first frame rate, the smoothness in movement of the video at the first frame rate is evaluated and at the same time, the second frame rate is determined using the evaluation. Further, the video process of the input video signal is carried out using the second frame rate determined based on the evaluation value for the input video signal. Therefore, it is possible to carry out the video process of the input video signal based on the second frame rate determined in accordance with the evaluation of the smoothness in movement. In other words, it is possible to determine a frame rate in accordance with the smoothness in movement of a video and at the same time, to carry out the video process of an input video signal while maintaining the smoothness in movement of the video.

[Other Aspects] The video evaluation device of the present invention is characterized by comprising an amount of displacement detection means for detecting an amount of displacement in movement that indicates the degree of displacement of an input video signal based on a plurality of frame pictures included in the input video signal and an evaluation value calculation means for calculating and outputting an evaluation value for evaluating the smoothness in movement of the input video signal based on the amount of displacement in movement and the frame rate of the input video signal.

The video evaluation method of the present invention is characterized by comprising an amount of displacement in movement detection step for detecting an amount of displacement in movement that indicates the degree of displacement of an input video signal based on a plurality of frame pictures included in the input video signal and an evaluation value calculation step for calculating and outputting an evaluation value for evaluating the smoothness in movement of the input video signal based on the amount of displacement in movement and the frame rate of the input video signal.

Further, the video evaluation program of the present invention is characterized by causing a computer to function as an amount of displacement detection means for detecting an amount of displacement in movement that indicates the degree of displacement of an input video signal based on a plurality of frame pictures included in the input video signal and an evaluation value calculation means for calculating an evaluation value for evaluating the smoothness in movement of the input video signal based on the amount of displacement in movement and the frame rate of the input video signal and outputting it to the outside.

According to the invention described above, the amount of displacement in movement is detected based on the plurality of frame pictures included in the input video signal and the evaluation value for evaluating the smoothness in movement of the input video signal is calculated based on the amount of displacement in movement and the frame rate of the input video signal. Therefore, it is possible to evaluate the smoothness in movement of a video at a frame rate during the period of video process in accordance with the amount of displacement in movement of the input video signal input at a predetermined frame rate. Further, since the evaluation value obtained by the evaluation is output to the outside, it becomes possible to determine a frame rate based on the evaluation value. In other words, it is possible to determine a frame rate in accordance with the smoothness in movement of a video.

In the video evaluation device of the present invention, it is preferable to further comprise a feature value calculation means for calculating a movement feature value that indicates the feature of movement of an input video signal based on the above-mentioned amount of displacement in movement, and for the above-mentioned evaluation value calculation means to calculate an evaluation value based on the movement feature value and the frame rate of the input video signal. With this, it is possible to calculate an evaluation value that takes into consideration the movement feature value that indicates the feature of the movement of the input video signal.

In the video evaluation device of the present invention, it is preferable for the above-mentioned evaluation value calculation means to compute an amount of movement that indicates the degree of movement between each frame based on the amount of displacement in movement and the frame rate of the input video signal and to calculate an evaluation value using the amount of movement. Further, it is preferable for the above-mentioned evaluation value calculation means to compute an amount of movement that indicates the degree of movement between each frame based on the movement feature value and the frame rate of the input video signal and to calculate an evaluation value using the amount of movement. With this, it is possible to calculate an evaluation value that takes into consideration the amount of movement that indicates the degree of movement between each frame.

In the video evaluation device of the present invention, it is preferable for the above-mentioned amount of displacement in movement to be a movement vector and for the above-mentioned feature value to be a value calculated based on the magnitude of the movement vector. With this, it is possible to calculate an evaluation value based on the magnitude of the movement vector between each frame.

The frame rate determination device of the present invention is characterized by comprising a frame rate generation means for generating a first frame rate, an amount of displacement detection means for detecting an amount of displacement in movement that indicates the degree of displacement of an input video signal, an evaluation value calculation means for calculating an evaluation value for evaluating the smoothness in movement of an input video signal based on the amount of displacement in movement and the first frame rate, and a frame rate determination means for determining a second frame rate for carrying out the process of an input video signal using the evaluation value and outputting it to the outside.

According to the present invention, the amount of displacement in movement is detected based on the plurality of frame pictures included in the input video signal, the evaluation value for evaluating the smoothness in movement of the input video signal is calculated based on the amount of displacement in movement and the first frame rate, and the second frame rate for carrying out the process of the input video signal is determined using the evaluation value. In other words, in accordance with the amount of displacement in movement of the input video signal input according to the first frame rate, the smoothness in movement of the video at the first frame rate is evaluated and at the same time, the second frame rate is determined using the evaluation. Therefore, it is possible to read the input video signal at the second frame rate determined in accordance with the evaluation of the smoothness in movement of the video. In other words, it is possible to determine a frame rate of an input video signal in accordance with the smoothness in movement of the video and at the same time, to read an input video signal while maintaining the smoothness in movement of the video.

In the frame rate determination device of the present invention, it is preferable for the above-mentioned frame rate determination means to set the second frame rate smaller than the first frame rate when the evaluation value is greater than a predetermined set value and to set the second frame rate greater than the first frame rate when the evaluation value is smaller than the predetermined set value by comparing the evaluation value with the predetermined set value. With this, it is possible to determine the second frame rate that is considered such that the evaluation value for evaluating the smoothness in movement of a video falls within a predetermined evaluation criterion range. In other words, it is possible to read the input video signal while keeping the smoothness in movement of a video within a predetermined criterion range.

The video process device of the present invention is characterized by comprising a buffer means for storing an input video signal, a frame rate generation means for generating a first frame rate, an amount of displacement detection means for detecting an amount of displacement in movement that indicates the degree of movement of an input video signal based on a plurality of frame pictures included in the input video signal, an evaluation value calculation means for calculating an evaluation value for evaluating the smoothness in movement of an input video signal based on the amount of displacement in movement and the first frame rate, a frame rate determination means for determining a second frame rate for carrying out the process of an input video signal using the evaluation value, and a video process means for reading the input video signal stored in the buffer means using the second frame rate and carrying out the video process.

According to the present invention, the amount of displacement in movement is detected based on the plurality of frame pictures included in the input video signal, the evaluation value for evaluating the smoothness in movement of the input video signal is calculated based on the amount of displacement in movement and the first frame rate, and the second frame rate for carrying out the process of the input video signal is determined using the evaluation value. Further, the video process of the input video signal is carried out using the second frame rate. In other words, in accordance with the amount of displacement in movement of the input video signal input according to the first frame rate, the smoothness in movement of the video at the first frame rate is evaluated and at the same time, the second frame rate is determined using the evaluation. Further, the video process of the input video signal is carried out using the second frame rate determined based on the evaluation value for the input video signal. Therefore, it is possible to carry out the video process of the input video signal based on the second frame rate determined in accordance with the evaluation of the smoothness in movement. In other words, it is possible to determine a frame rate in accordance with the smoothness in movement of a video and at the same time, to carry out the video process of an input video signal while maintaining the smoothness in movement of the video.

According to the video evaluation device, the frame rate determination device, the video process device, the video evaluation method, the frame rate determination method, the video process method, the video evaluation program, the frame rate determination program, and the video process program of the present invention, since it is possible to determine a frame rate in accordance with the smoothness in movement of a video, it becomes possible to provide a video with smoothness in movement while reducing the amount of process, the amount of data, and the power consumption.

BRIEF DESCRIPTION OF THE DRAWINGS

FIG. 16 is a diagram for explaining a method for evaluating the smoothness in movement. (a) is a diagram for explaining a method for computing an amount of change in time and (b) is a diagram for explaining a method for calculating an evaluation value based on an amount of change in time.

DESCRIPTION OF THE PREFERRED EMBODIMENTS

Each embodiment of video evaluation device, frame rate determination device, video process device, a video evaluation method, a frame rate determination method, a video process method, a video evaluation program, a frame rate determination program, and a video process program according to the present invention is explained below based on drawings. The same symbols are attached to the same components in each drawing and no duplicated explanation will be given here.

First Embodiment

Figure 14:
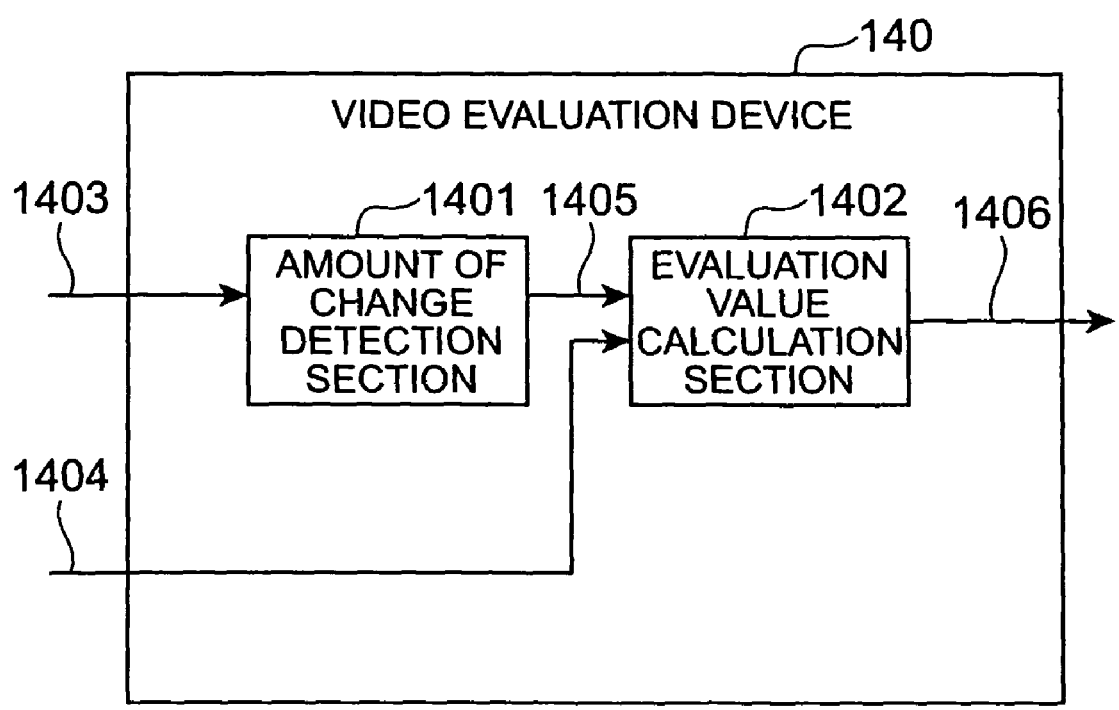
FIG. 14 is a diagram illustrating a functional configuration of video evaluation device in the first embodiment.

First, a first embodiment of the present invention is explained below. FIG. 14 is a diagram illustrating a functional configuration of video evaluation device 140 in the first embodiment.

Here, the video evaluation device 140 is physically a computer comprising a CPU (Central Processing Unit), storage units such as memory, communication devices, etc. Therefore, the video evaluation device 140 may be a fixed communication terminal such as PC terminal or may be a mobile communication terminal such as mobile phone. In other words, as the video evaluation device 140, device capable of processing information can be applied widely.

The functional configuration of the video evaluation device 140 is explained with reference to FIG. 14. As shown in FIG. 14, the video evaluation device 140 has an amount of change detection section 1401 and an evaluation value calculation section 1402.

The amount of change detection section 1401 divides an input video signal 1403 input as a moving picture signal from the outside into frame pictures. The amount of change detection section 1401 detects an amount of change that indicates the degree of change between each frame picture of the input video signal based on the plurality of divided frame pictures. The amount of change detection section 1401 outputs a detected amount of change 1405 to the evaluation value calculation section 1402.

Figure 15:
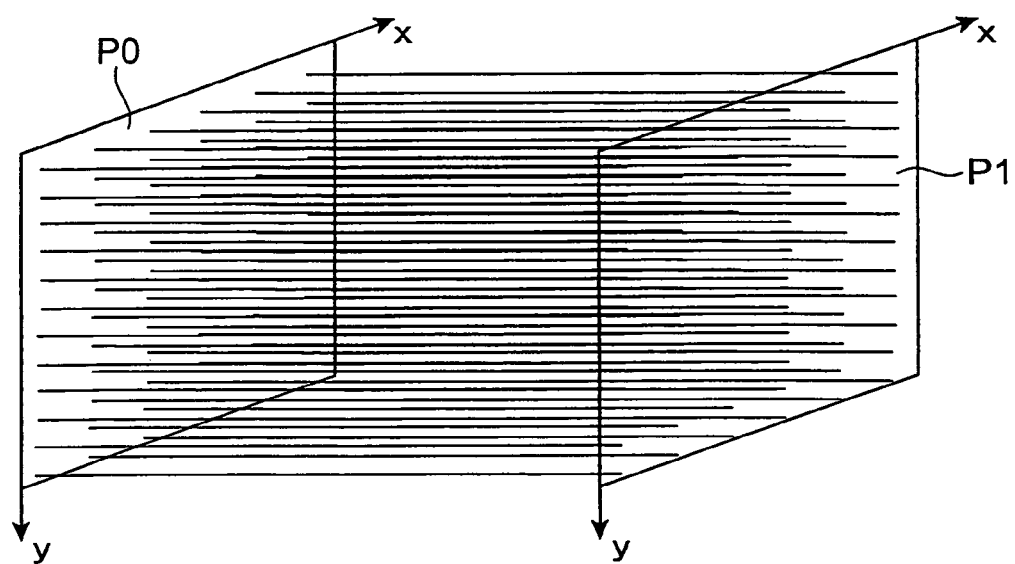
FIG. 15 is a diagram for explaining a method for detecting an amount of change.

Here, a method for detecting the amount of change 1405 is explained specifically with reference to FIG. 15. The amount of change detection section 1401 sequentially reads two successive frame pictures divided from the input video signal 1403. Here, for simplicity of explanation, the two successive frame pictures are referred to as a frame picture P0 and a frame picture P1 in order of read. The amount of change detection section 1401 finds the difference in luminance value between pixels located at the same coordinates in the read frame picture P1 and frame picture P0 and calculates the square of the difference for each pixel included in the entire frame picture. The amount of change detection section 1401 detects the amount of change 1405 by calculating the average value of the above-mentioned squared values calculated for each pixel. Therefore, the calculated average value is output to the evaluation value calculation section 1402 as the amount of change 1405.

The evaluation value calculation section 1402 computes an amount of change in time in accordance with the amount of change 1405 and the time interval between each frame picture based on the amount of change 1405 received from the amount of change detection section 1401 and the time interval between each frame picture based on frame rate information 1404 received from the outside. The evaluation value calculation section 1402 calculates an evaluation value for evaluating the smoothness in movement of an input video based on the computed amount of change in time. The evaluation value calculation section 1402 outputs a calculated evaluation value 1406 to the outside. Here, the outside corresponds, for example, to device such as one for determining an optimum frame rate for carrying out the vide process of the input video signal 1403 based on the evaluation value 1406. By outputting the evaluation value 1406 to such external device, it becomes possible to determine a frame rate in accordance with the smoothness in movement of the video of the input video signal 1403.

Here, a method for evaluating the smoothness in movement is explained specifically with reference to FIG. 16. First, for example, a method for computing an amount of change in time S1 at a time T1 is explained with reference to FIG. 16 (a). The evaluation value calculation section 1402 computes the amount of change in time S1 based on a time interval Δt1 between a time T0 of the frame picture P0 and the time T1 of the frame picture P1 based on the frame rate information 1404 and an amount of change Δc1. The time interval Δt1 between the time T0 and the time T1 will be 1/F1 sec when the frame rate of the frame rate information 1404 at the time T1 is, for example, F1 fps.

The method for computing an amount of change in time is explained more specifically. As shown in FIG. 16 (a), the amount of change in time S1 at the time T1 will be Δt1·Δc1 (the area of the portion S1 hatched with slash lines shown in FIG. 16 (a)) when, for example, the time interval between the time T0 and the time T1 is assumed to be Δt1 and the amount of change at the time T1 is assumed to be Δc1. Similarly, an amount of change in time S2 at a time T2 will be Δt2·Δc2 (the area of the portion S2 hatched with slash lines shown in FIG. 16 (a)) when, for example, the time interval between the time T1 and the time T2 is assumed to be Δt2 and the amount of change at the time T2 is assumed to be Δc2.

Next, a method for calculating an evaluation value based on an amount of change in time is explained with reference to FIG. 16 (b). The evaluation value calculation section 1402 calculates an evaluation value of the smoothness in movement of each frame picture at a time Tn (n: positive integer, this also applies hereinafter) for all of the frame pictures included in an input video signal. This is explained specifically. The evaluation value calculation section 1402 calculates an evaluation value of the smoothness in movement at the time Tn using an amount of change in time Sn of each frame picture at the time Tn. This is explained more specifically. The evaluation value calculation section 1402 calculates an evaluation value of the smoothness in movement at the time Tn using, for example, an expression α/Sn (α is a constant) including the amount of change in time Sn. Further, it may also be possible for the evaluation value calculation section 1402 to calculate an evaluation value of the smoothness in movement at the time Tn using an expression $a \times \exp^{-bSn} + c$ (a, b, c are constants) including the amount of change in time Sn. The evaluation value calculation section 1402 calculates the average value of the evaluation values of the smoothness in movement at all the times of an input video. The average value is output to the outside as the final evaluation value 1406 of the input video.

Figure 17:
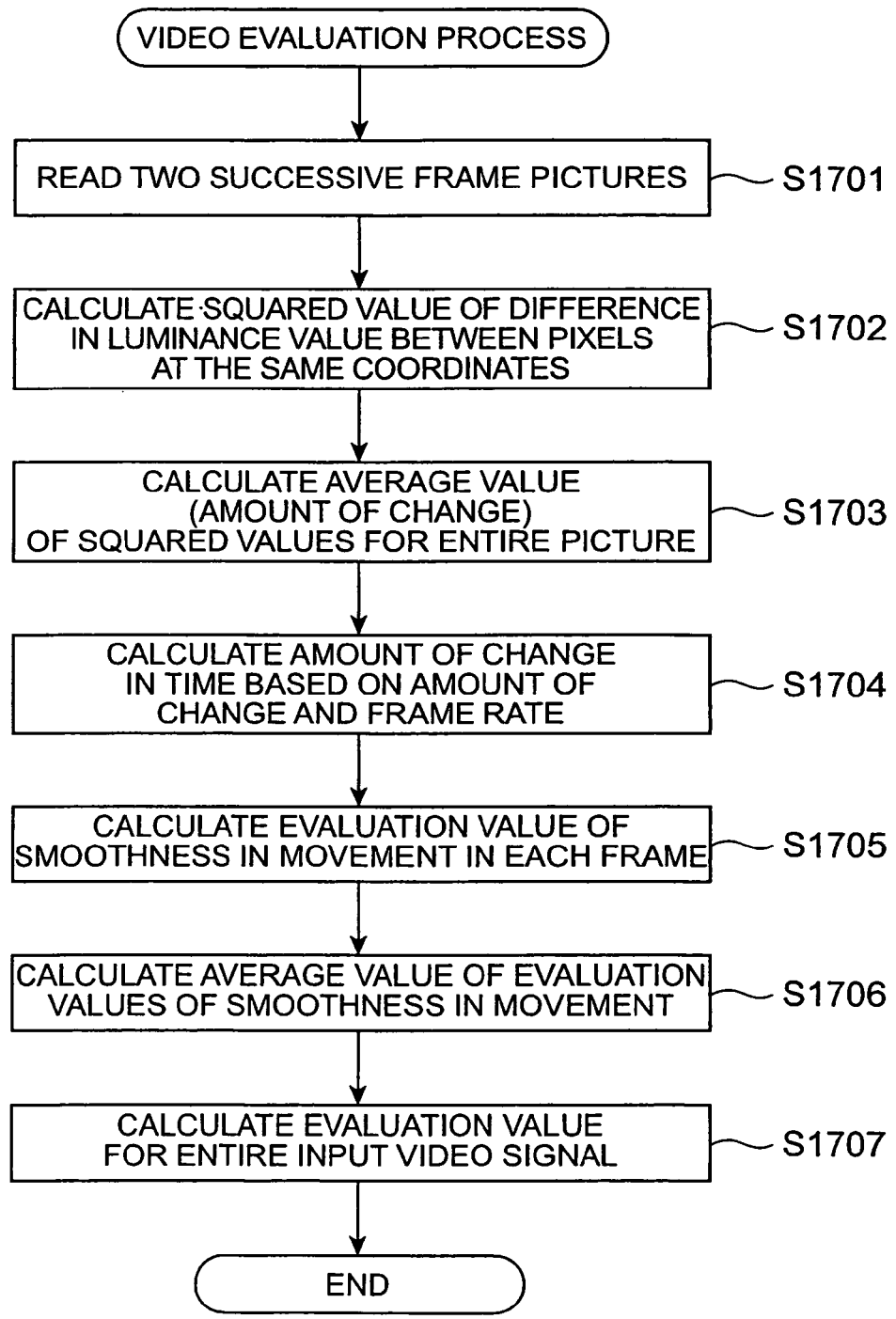
FIG. 17 is a flow chart showing a flow of a video evaluation process in the first embodiment.

Next, a flow of a video evaluation process in the video evaluation device 140 in the first embodiment is explained below with reference to FIG. 17.

First, the amount of change detection section 1401 sequentially reads the two successive frame pictures (the frame picture P0, the frame picture P1) divided from the input video signal 1403 (step S1701).

Next, the amount of change detection section 1401 finds the difference in luminance value between pixels located at the same coordinates in the read frame picture P1 and frame picture P0 and calculates the square of the difference for each pixel included in the entire frame picture (step S1702).

Next, the amount of change detection section 1401 calculates the average value of the above-mentioned squared values calculated for each pixel (step S1703). The calculated average value is output to the evaluation value calculation section 1402 as the amount of change 1405.

Next, the evaluation value calculation section 1402 calculates an amount of change in time in accordance with the amount of change 1405 and the time interval between each frame picture based on the amount of change 1405 received from the amount of change detection section 1401 and the time interval between each frame picture based on the frame rate information 1404 received from the outside (step S1704).

Next, the evaluation value calculation section 1402 calculates an evaluation value of the smoothness in movement at the time Tn of each frame picture for all the frame pictures included in the input video signal using the amount of change in time (step S1705).

Next, the evaluation value calculation section 1402 calculates the average value of the evaluation values of the smoothness in movement at all the times of the input video based on each of the calculated evaluation values (step S1706).

Next, the evaluation value calculation section 1402 outputs the calculated average value to the outside as the evaluation value 1406 of the smoothness in movement for the entire input video signal 1403 (step S1707).

As described above, according to the video evaluation device 140 in the first embodiment, the amount of change is calculated based on the squared value of the difference in luminance value between each frame of the plurality of frame pictures included in the input video signal. Further, the evaluation value for evaluating the smoothness in movement of the input video signal is calculated based on the amount of change and the time interval between frame pictures based on the frame rate of the input video signal. Therefore, it is possible to evaluate the smoothness in movement of the video at the frame rate during the period of video process based on the amount of change in luminance value of the input video signal input in accordance with the predetermined frame rate. Further, it becomes possible to determine a frame rate outside based on the evaluation value because the evaluation value obtained by the evaluation is output to the outside. In other words, it is possible to determine a frame rate in accordance with the smoothness in movement of the video.

The unit used for the amount of change detection by the amount of change detection section 1401 described above is not limited to the above-mentioned entire frame picture. For example, the unit may be a block, a pixel, an object region, etc.

The method of the amount of change detection by the amount of change detection section 1401 is not limited to that described above, in which the average value of the squared values calculated for each pixel included in the frame picture is used. For example, it may also be possible to use the maximum value, the median value, or the minimum value of the above-mentioned squared values calculated for each pixel, or to use the square root of the maximum value, the median value, or the minimum value of the above-mentioned squared values, or to use the variance of the above-mentioned squared values for the entire frame picture.

The method of the amount of change detection by the amount of change detection section 1401 is not limited to that described above, in which the squared value of the difference in luminance value between pixels located at the same coordinates in each frame is used. For example, it may also be possible to use the value of difference in luminance value between pixels located at the same coordinates in each frame, or the absolute value of the difference.

In the method of the amount of change detection by the amount of change detection section 1401, it is possible to use any value that indicates the change in the input video signal between frames such as the movement vector between frame pictures of the input video signal, in addition to those values described above.

The method for computing the amount of change in time by the evaluation value calculation section 1402 is not limited to that described above, in which the above-mentioned expression (for example, Δt1−Δc1) is used, but it is only necessary for the method to be capable of computing it based on the amount of change and the time interval between frame pictures based on the frame rate information.

The amount of change in time computed by the evaluation value calculation section 1402 is not necessarily one for each frame. For example, it may be one for each block, pixel, or object.

The final evaluation value 1406 of the input video calculated by the evaluation value calculation section 1402 is not limited to the above-mentioned average value of the evaluation values of the smoothness in movement at all the times of the input video. For example, it may be the maximum value, the median value, or the minimum value of the evaluation values of the smoothness in movement at all the times of the input video.

The final evaluation value 1406 of the input video calculated by the evaluation value calculation section 1402 is not necessarily one for all of the frame pictures included in the input video signal. For example, it may be one for some frame pictures, or for each frame picture, block, pixel, or object.

Finally, a video evaluation program 180 for causing a computer to function as the above-mentioned video evaluation device 140 is explained with reference to FIG. 18.

Figure 18:
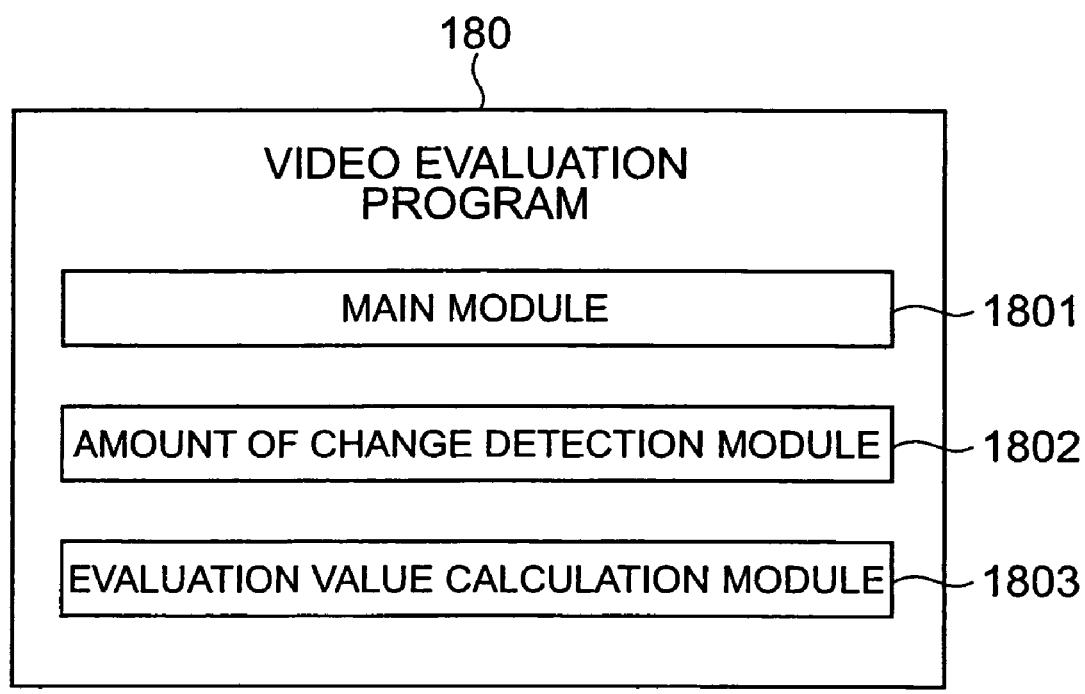
FIG. 18 is a diagram illustrating a module configuration of a video evaluation program in the first embodiment.

As shown in FIG. 18, the video evaluation program 180 comprises a main module program 1801 for generalizing processes, an amount of change detection module 1802, and an evaluation value calculation module 1803. The functions that the amount of change detection module 1802 and the evaluation value calculation module 1803 cause a computer to carry out are the same as those possessed by the above-mentioned amount of change detection section 1401 and the evaluation value calculation section 1402.

The video evaluation program 180 is provided by, for example, storage media such as CD-ROM, DVD, and ROM or semiconductor memories. It may also be possible for the video evaluation program 180 to be provided via a network as a computer data signal multiplexed on carriers.

Modification Example of the First Embodiment

Figure 1:
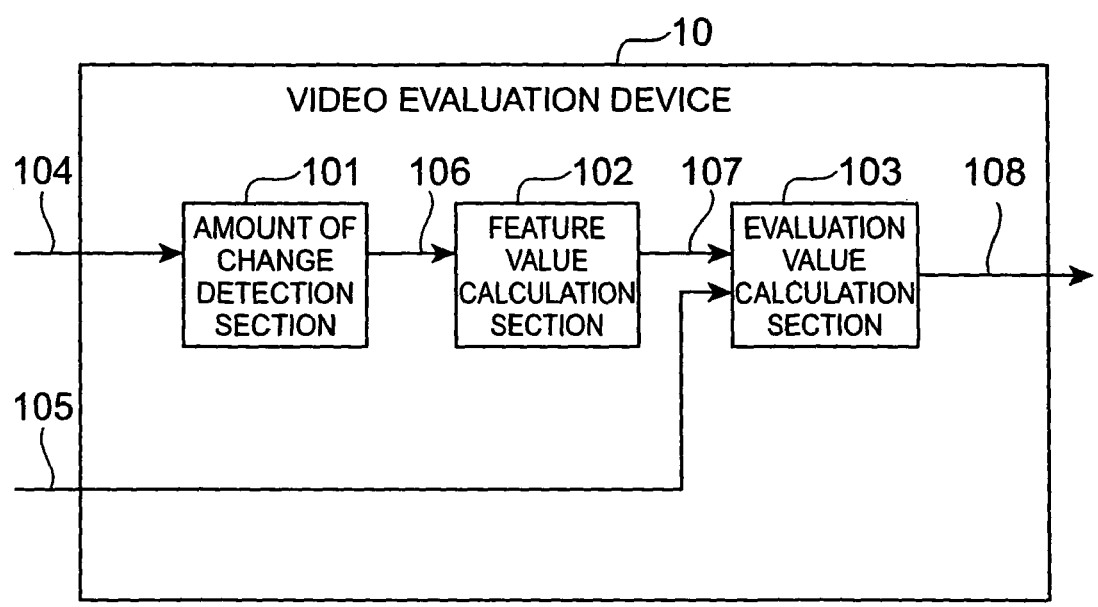
FIG. 1 is a diagram illustrating a functional configuration of video evaluation device in a modification example of a first embodiment.

Next, a modification example of the above-mentioned first embodiment is explained. FIG. 1 is a diagram illustrating a functional configuration of video evaluation device 10 in a modification example of the first embodiment.

Here, the video evaluation device 10 is physically a computer comprising a CPU (Central Processing Unit), storage units such as memory, communication devices, etc. Therefore, the video evaluation device 10 may be a fixed communication terminal such as PC terminal or may be a mobile communication terminal such as mobile phone. In other words, as the video evaluation device 10, device capable of processing information can be applied widely.

The functional configuration of the video evaluation device 10 is explained with reference to FIG. 1. As shown in FIG. 1, the video evaluation device 10 has an amount of displacement detection section 101, a feature value calculation section 102, and an evaluation value calculation section 103.

The amount of displacement detection section 101 divides an input video signal 104 input as a moving picture signal from the outside into frame pictures. The amount of displacement detection section 101 detects an amount of displacement (an amount of displacement in movement) that indicates the degree of displacement in movement of the input video signal based on the plurality of divided frame pictures. The amount of displacement detection section 101 outputs a detected amount of displacement 106 to the feature value calculation section 102.

The amount of displacement is not limited to that which indicates the degree of displacement in movement of an input video signal, but it is only necessary for the amount of displacement to indicate the degree of change between each frame picture of an input video signal.

Figure 2:
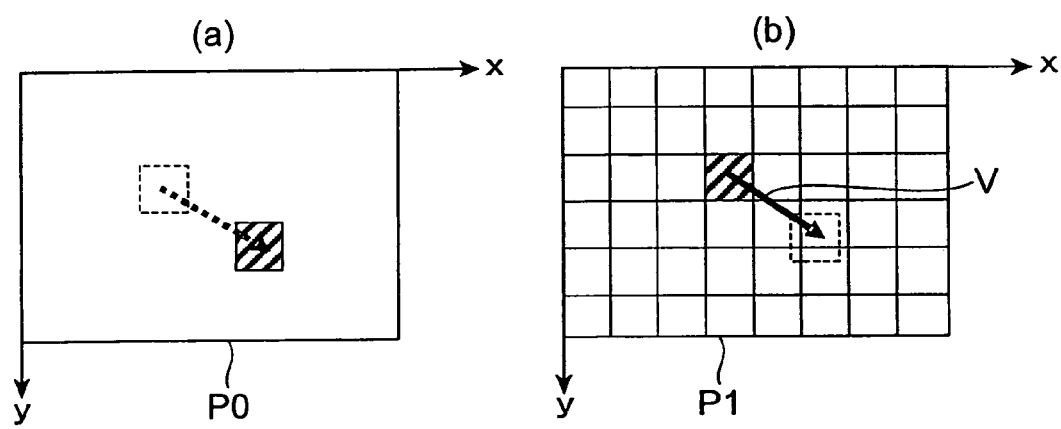
FIG. 2 is a diagram for explaining a method for detecting an amount of displacement. (a) shows a frame picture P0 and (b) is a diagram showing a frame picture P1.

Here, a method for detecting the amount of displacement 106 is explained specifically with reference to FIG. 2. The amount of displacement detection section 101 sequentially reads two successive frame pictures divided from the input video signal 104. Here, for simplicity of explanation, the two successive frame pictures are referred to as the frame picture P0 (refer to FIG. 2 (*a*)) and the frame picture P1 (refer to FIG. 2 (*b*)) in order of read. The amount of displacement detection section 101 divides the read frame picture P1 into blocks having a predetermined size. The amount of displacement detection section 101 searches the frame picture P0 for a picture signal pattern that best resembles the picture signal pattern of each block for each block of the frame picture P1. This search can be realized by using, for example, a search process by the block matching (correlation method) shown in FIG. 2. The amount of displacement detection section 101 detects a movement vector V (MVx, MVy) that is a spatial amount of displacement between signal patterns of both pictures based on the signal patterns of both pictures, judged to resemble each other by the search process. The movement vector V is output to the feature value calculation section 102 as the amount of displacement 106.

The feature value calculation section 102 calculates a movement feature value 107 that indicates the movement feature of an input video signal based on the amount of displacement 106 received from the amount of displacement detection section 101. The feature value calculation section 102 outputs the calculated movement feature value 107 to the evaluation value calculation section 103.

Here, a method for calculating a movement feature value is explained specifically. The feature value calculation section 102 finds the magnitude of the movement vector of each block of the frame picture P1 using the movement vector of each block of the frame picture P1 received as the amount of displacement 106. If, for example, it is assumed that the x component and the y component of the movement vector of an arbitrary block on the frame picture P1 are referred to as MVx and MVy, respectively, the magnitude of the movement vector can be obtained from $(MVx^2+MVy^2)^{1/2}$. The feature value calculation section 102 calculates a value that features the frame picture P1 based on the magnitude of each movement vector. The calculated value is output to the evaluation value calculation section 103 as the movement feature value 107. As the value (the movement feature value 107) calculated by the feature value calculation section 102, for example, the maximum value, the median value, or the minimum value of the magnitudes of the movement vectors obtained for each block included in the frame picture apply.

The evaluation value calculation section 103 computes an amount of movement between frames that indicates the degree of movement between each frame picture based on the movement feature value 107 received from the feature value calculation section 102 and the time interval between frame pictures based on frame rate information 105 received from the outside. The evaluation value calculation section 103 calculates an evaluation value for evaluating the smoothness in movement of an input video signal based on the computed amount of movement between frames. The evaluation value calculation section 103 outputs a calculated evaluation value 108 to the outside. Here, as the outside, for example, device etc. applies, which determines an optimum frame rate for carrying out the video process of the input video signal 104 based on the evaluation value 108. By outputting the evaluation value 108 to such external device, it becomes possible to determine a frame rate in accordance with the smoothness in movement of the video of the input video signal 104.

When calculating an evaluation value, it is not necessarily required to calculate it based the amount of movement between frames. For example, it may also be possible to calculate an evaluation value based on the amount of displacement 106 and the amount of change in time in accordance with the time interval between each frame picture. It is possible to compute the amount of change in time based on the movement feature value 107 received from the feature value calculation section 102 and the time interval between frame pictures based on the frame rate information 105 received from the outside.

Figure 3:
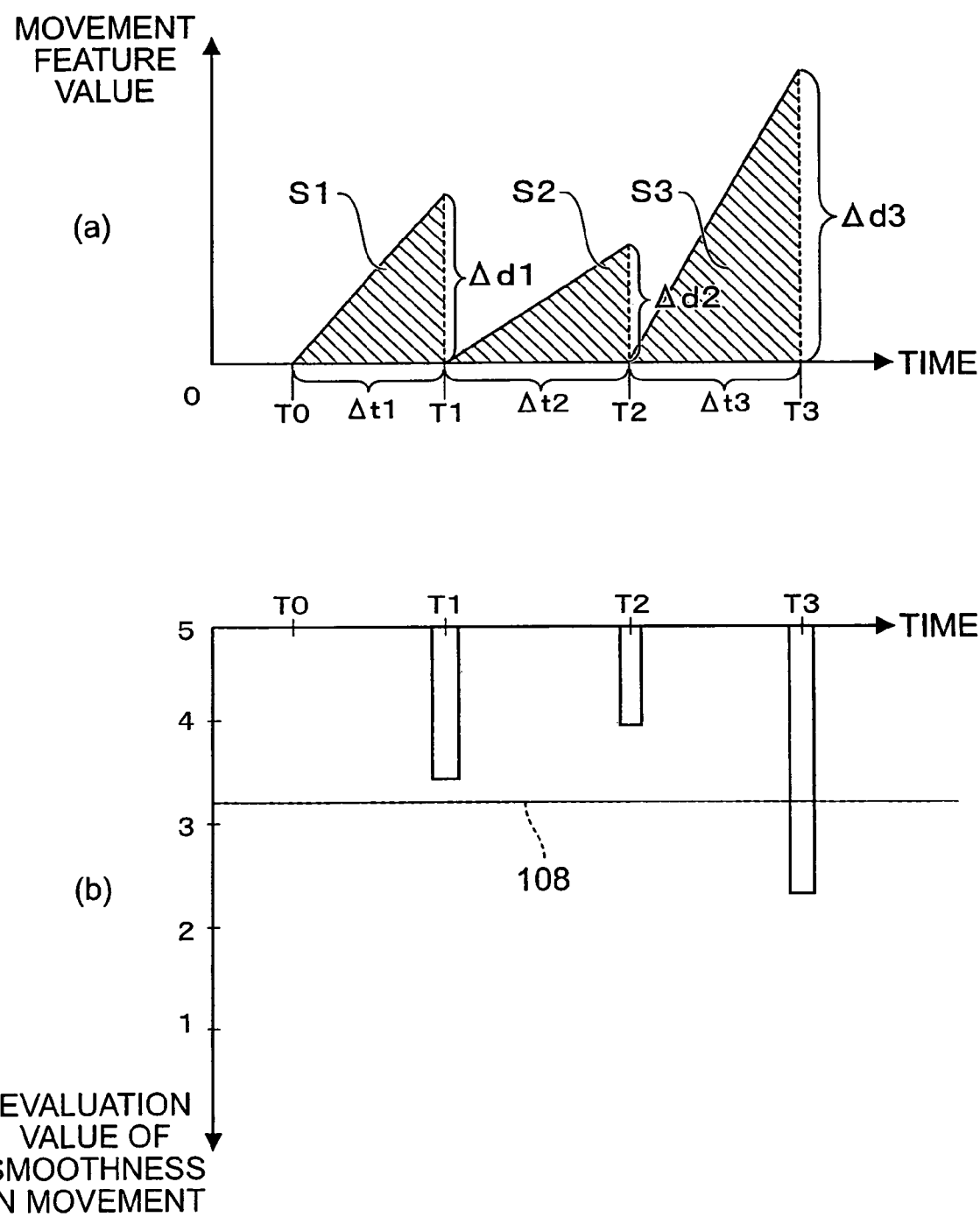
FIG. 3 is a diagram for explaining a method for evaluating the smoothness in movement. (a) is a diagram for explaining a method for computing an amount of movement between frames and (b) is a diagram for explaining a method for computing an evaluation value based on an amount of movement between frames.

Here, a method for evaluating the smoothness in movement is explained specifically with reference to FIG. 3. First, for example, a method for computing the amount of movement between frames S1 at the time T1 is explained with reference to FIG. 3 (*a*). The evaluation value calculation section 103 computes the amount of movement between frames S1 based on the time interval $\Delta t1$ between the time T0 of the frame picture P0 and the time T1 of the frame picture P1 based on the frame rate information 105 and a movement feature value $\Delta d1$ of the frame picture P1. The time interval $\Delta t1$ between the time T0 and the time T1 will be 1/F1 sec when the frame rate of the frame rate information 105 at the time T1 is, for example, F1 fps.

The method for computing an amount of movement between frames is explained more specifically. As shown in FIG. 3 (a), the amount of movement between frames S1 at the time T1 will be Δt1·Δd1/2 (the area of the portion S1 hatched with slash lines shown in FIG. 3 (a)) when, for example, the time interval between the time T0 and the time T1 is assumed to be Δt1 and the movement feature value at the time T1 is assumed to be Δd1. Similarly, an amount of movement between frames S2 at the time T2 will be Δt2·Δd2/2 (the area of the portion S2 hatched with slash lines shown in FIG. 3 (a)) when, for example, the time interval between the time T1 and the time T2 is assumed to be Δt2 and a movement feature value at the time T2 is assumed to be Δd2.

Next, a method for calculating an evaluation value based on an amount of movement between frames is explained with reference to FIG. 3 (b). The evaluation value calculation section 103 calculates an evaluation value of the smoothness in movement of each frame picture at the time Tn (n: positive integer, this also applies hereinafter) for all of the frame pictures included in an input video signal. This is explained specifically. The evaluation value calculation section 103 calculates an evaluation value of the smoothness in movement at the time Tn using the amount of movement between frames Sn of each frame picture at the time Tn. This is explained more specifically. The evaluation value calculation section 103 calculates an evaluation value of the smoothness in movement at the time Tn using, for example, the expression α/Sn (α is a constant) including the amount of movement between frames Sn. Further, it may also be possible for the evaluation value calculation section 103 to calculate an evaluation value of the smoothness in movement at the time Tn using the expression $a \times \exp^{-bSn} + c$ (a, b, c are constants) including the amount of movement between frames Sn. The evaluation value calculation section 103 calculates the average value of the evaluation values of the smoothness in movement at all the times of an input video. The average value is output to the outside as the final evaluation value 108 of the input video.

Figure 4:
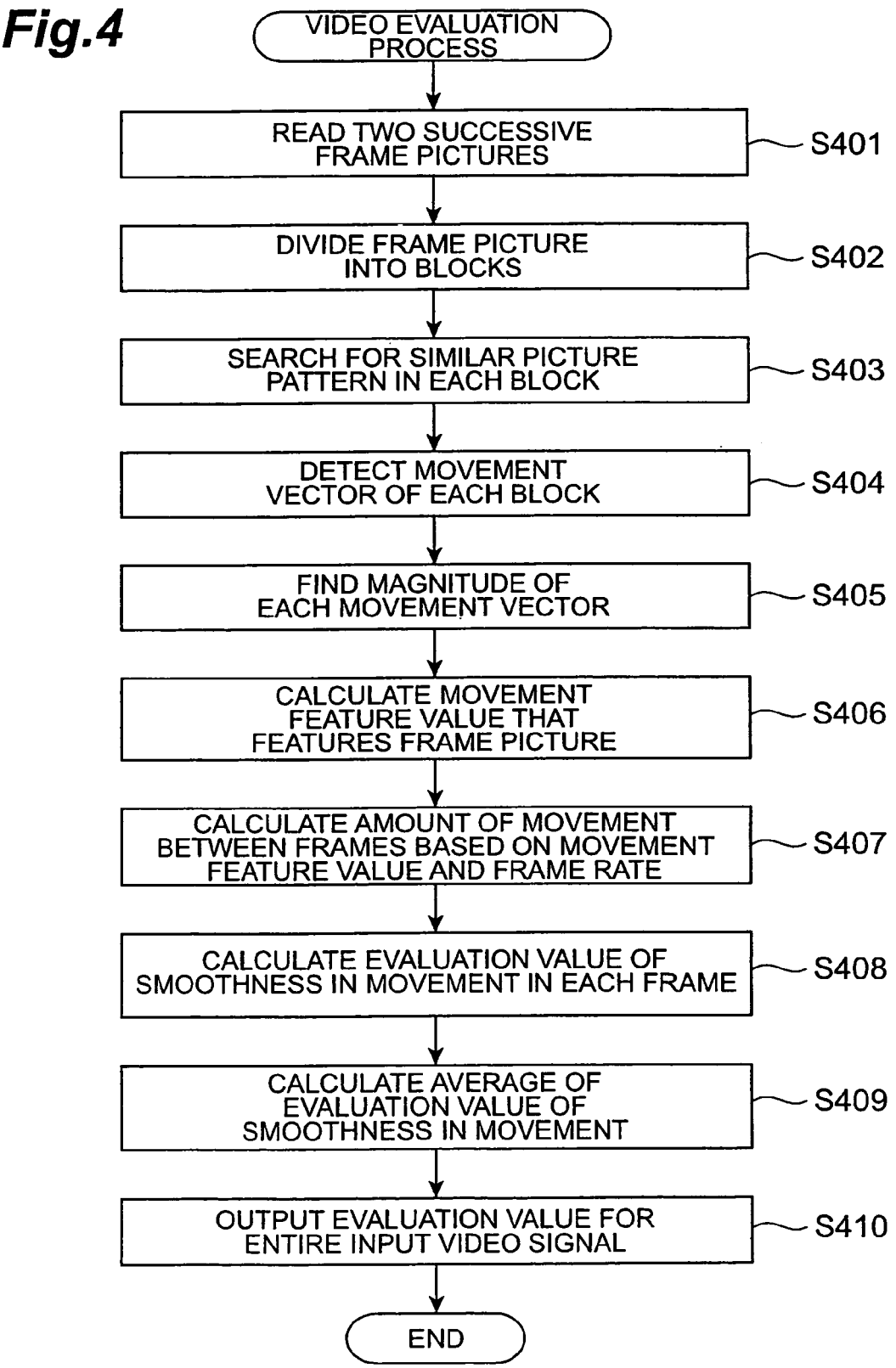
FIG. 4 is a flow chart showing a video evaluation process in a modification example of the first embodiment.

Next, a flow of a video evaluation process in the video evaluation device 10 in the modification example of the first embodiment is explained below with reference to FIG. 4.

First, the amount of displacement detection section 101 sequentially reads the two successive frame pictures (the frame picture P0, the frame picture P1) divided from the input video signal 104 (step S401).

Next, the amount of displacement detection section 101 divides the read frame picture P1 into blocks having a predetermined size (step S402).

Next, the amount of displacement detection section 101 searches the frame picture P0 for a picture signal pattern that best resembles the picture signal pattern of each block for each block of the frame picture P1 (step S403).

The amount of displacement detection section 101 detects a movement vector (MVx, MVy) that is a spatial amount of displacement between the picture signal patterns based on the signal patterns of both pictures judged to resemble each other by the search (step S404). The detected movement vector is output to the feature value calculation section 102 as the amount of displacement 106.

Next, the feature value calculation section 102 finds the magnitude of the movement vector of each block of the frame picture P1 using the movement vector of each block of the frame picture P1 included in the amount of displacement 106.

Next, the feature value calculation section 102 calculates a value that features the frame picture P1 based on the magnitude of each movement vector (step S406). The calculated value is output to the evaluation value calculation section 103 as the movement feature value 107.

Next, the evaluation value calculation section 103 calculates an amount of displacement between frames, which is an amount of movement between each frame picture, based on the movement feature value 107 received from the feature value calculation section 102 and the time interval between each frame picture based on the frame rate information 105 received from the outside (step S407).

Next, the evaluation value calculation section 103 calculates an evaluation value of the smoothness in movement at the time Tn of each frame picture for all the frame pictures included in the input video signal using the amount of movement between frames (step S408).

Next, the evaluation value calculation section 103 calculates the average value of the evaluation values of the smoothness in movement at all the times of the input video based on each of the calculated evaluation values (step S409).

Next, the evaluation value calculation section 103 outputs the calculated average value to the outside as the evaluation value 108 of the smoothness in movement for the entire input video signal 104 (step S410).

As described above, according to the video evaluation device 10 in the modification example of the first embodiment, the movement vector is detected based on the plurality of frame pictures included in the input video signal and the movement feature value is calculated based on the magnitude of the movement vector. Further, the evaluation value for evaluating the smoothness in movement of the input video signal is calculated based on the movement feature value and the time interval between frame pictures based on the frame rate of the input video signal. Therefore, it is possible to evaluate the smoothness in movement of the video at the frame rate during the period of video process based on the magnitude of the movement vector of the input video signal input in accordance with the predetermined frame rate. Further, it becomes possible to determine a frame rate outside based on the evaluation value because the evaluation value obtained by the evaluation is output to the outside. In other words, it is possible to determine a frame rate in accordance with the smoothness in movement of the video.

The unit used for searching for a picture signal pattern by the above-mentioned amount of displacement detection section 101 is not limited to the block. For example, the unit may be a frame, a pixel, an object region, etc. Further, the method of the search process by the amount of displacement detection section 101 is not limited to the above-mentioned block matching. For example, it may be a concentration gradient method.

The amount of displacement detection section 101 may read the input video signal 104 including the movement vector of a video as the above-mentioned input video signal 104. In this case, the amount of displacement detection section 101 detects the movement vector from the input video signal 104 received from the outside and outputs the detected movement vector to the feature value calculation section 102 as the amount of displacement 106.

The movement feature value 107 calculated by the feature value calculation section 102 is not limited to the maximum value, the average value, the median value, or the minimum value of the magnitudes of the movement vectors obtained for each of the blocks as described above. For example, it may be the magnitude of one movement vector obtained for each frame picture or the maximum value, the average value, the median value, or the minimum value of the magnitudes of the movement vectors obtained for each pixel in the frame picture or for each object region.

The movement feature value 107 calculated by the feature value calculation section 102 is not necessarily required to be one for each frame. For example, it may be one for each block, pixel, or object. Further, the movement feature value 107 may be one for each of ranges R (for example, R1, R2, R3) defined by the plurality of circles with the origin shown in FIG. 5 being their center and the plurality of lines extending from the origin with respect to the distribution of the movement vectors obtained for each block, pixel, or object.

Figure 5:
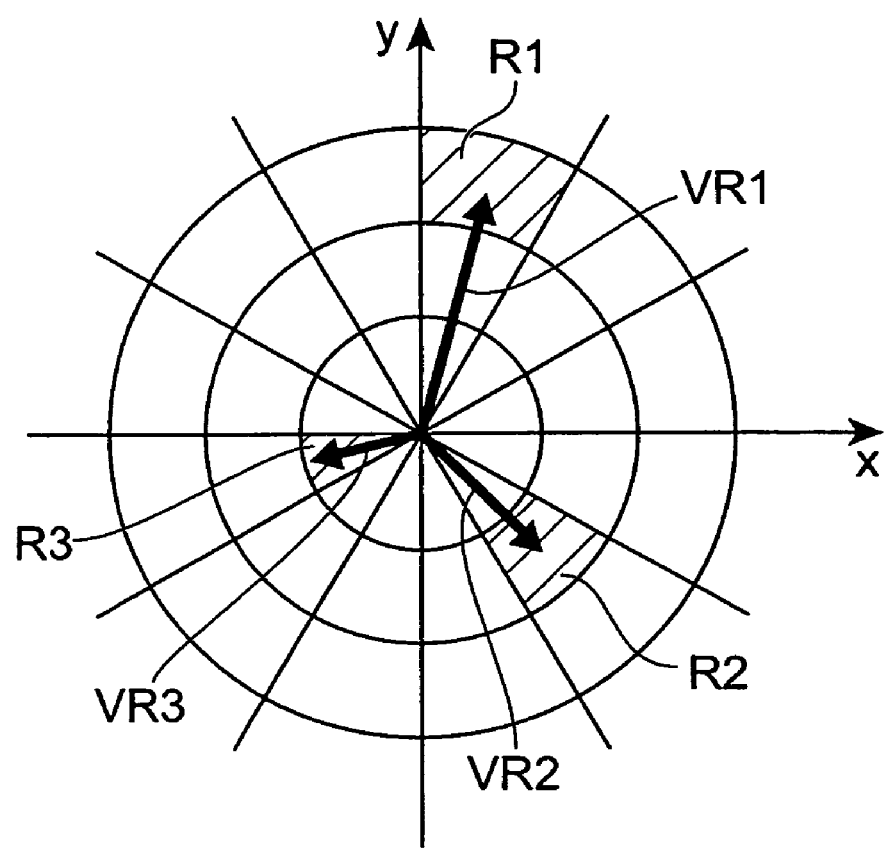
FIG. 5 is a diagram for explaining a range obtained based on the magnitude and direction of each movement vector.

Here, a method for calculating the movement feature value 107 for each of the above-mentioned ranges R is explained specifically with reference to FIG. 5, a case where one frame picture is divided into nine blocks being an example. First, a movement vector is obtained for each of the nine divided blocks. It is assumed that each of the obtained movement vectors is referred to as V1 to V9. Next, each of the movement vectors V1 to V9 is projected on a graph shown in FIG. 5. For example, it is assumed that the movement vectors V1 to V4 are included in the range R1 shown in FIG. 5, the movement vectors V5 and V6 are included in the range R2 shown in FIG. 5, and the movement vectors V7 to V9 are included in the range R3 shown in FIG. 5. In this case, for example, a movement vector VR1 calculated as the average value of the movement vectors V1 to V4 is obtained as the movement feature value 107 in the range R1, a movement vector VR2 calculated as the average value of the movement vectors V5 and V6 is obtained as the movement feature value 107 in the range R2, and a movement vector VR3 calculated as the average value of the movement vectors V7 to V9 is obtained as the movement feature value 107 in the range R3, as a result. The method for obtaining a movement vector is not limited to the method that uses a block as the unit, and the unit may be, for example, a pixel or an object.

The method for computing the amount of movement between frames by the evaluation value calculation section 103 is not limited to the method that uses the above-mentioned expression (for example, $\Delta t1 \cdot \Delta d1/2$). For example, it may be computed from the expression $\beta \cdot MVx \cdot \Delta t1/2 + \gamma \cdot MVy \cdot \Delta t1/2$ ($\beta$, $\gamma$ are constants) expressed by using the movement vector (MVx, MVy), which is the amount of displacement 106, and time interval between frame pictures based on the frame rate information 105.

The amount of movement between frames computed by the evaluation value calculation section 103 is not necessarily required to be one for each frame. For example, it may be one for each block, pixel, object, or for each of the above-mentioned ranges R (refer to FIG. 5).

The calculation of the evaluation value of the smoothness in movement at the time Tn of each frame picture calculated by the evaluation value calculation section 103 is not limited to the calculation using the above-mentioned $\alpha/Sn$ ($\alpha$ is a constant) or $a \times \exp^{-bSn} + c$ (a, b, c are constants). For example, it may be calculated from a function using the movement vector (MVx, MVy), which is the amount of displacement 106, and the time interval between frame pictures based on the frame rate information 105.

The final evaluation value 108 of an input video signal calculated by the evaluation value calculation section 103 is not limited to the above-mentioned average value of the evaluation values of the smoothness in movement at all the times of the input video. For example, it may be the maximum value, the median value, or the minimum value of the evaluation values of the smoothness in movement at all the times of the input video.

The final evaluation value 108 of an input video calculated by the evaluation value calculation section 103 is not necessarily required to be one for the entire frame picture included in the input video signal. For example, it may be one for some frame pictures, or for each frame picture, block, pixel, object, or for each of the above-mentioned ranges R (refer to FIG. 5).

Finally, a video evaluation program 50 for causing a computer to function as the above-mentioned video evaluation device 10 is explained with reference to FIG. 6.

Figure 6:
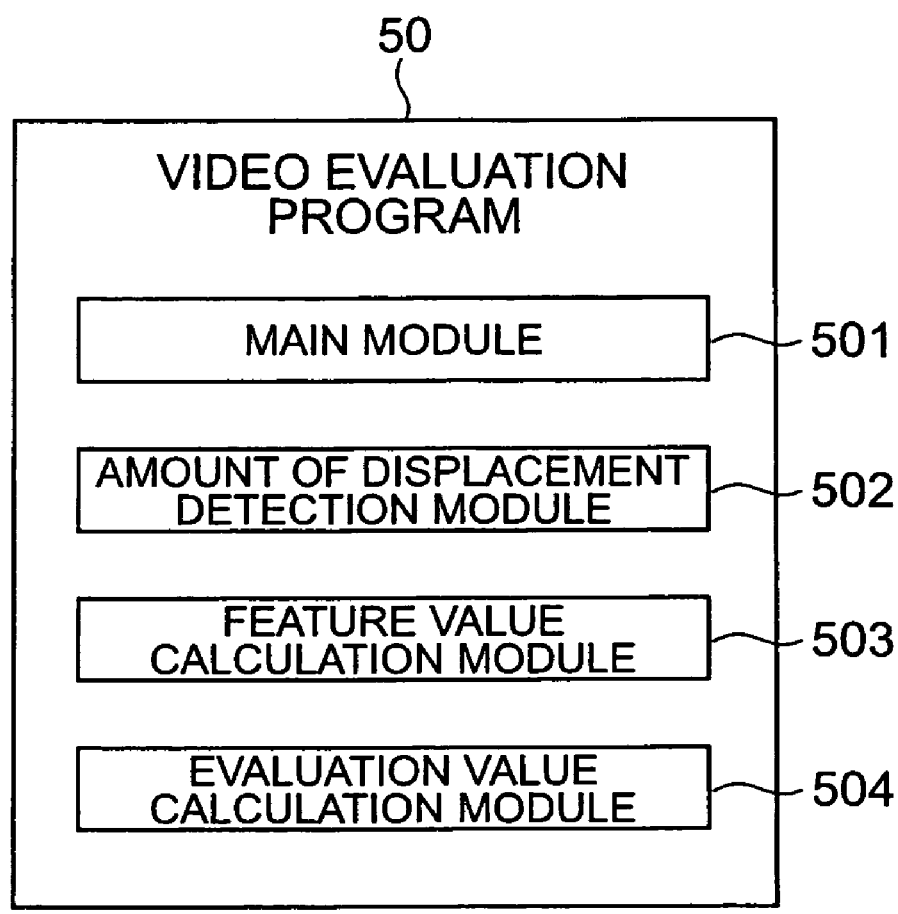
FIG. 6 is a diagram illustrating a module configuration of a video evaluation program in a modification example of the first embodiment.

As shown in FIG. 6, the video evaluation program 50 comprises a main module program 501 for generalizing processes, an amount of displacement detection module 502, a feature value calculation module 503, and an evaluation value calculation module 504. The functions that the amount of displacement detection module 502, the feature value calculation module 503, and the evaluation value calculation module 504 cause a computer to carry out are the same as those possessed by the above-mentioned amount of displacement detection section 101, the feature value calculation section 102, and the evaluation value calculation section 103.

The video evaluation program 50 is provided by, for example, storage media such as CD-ROM, DVD, and ROM or semiconductor memories. It may also be possible for the video evaluation program 50 to be provided via a network as a computer data signal multiplexed on carriers.

Further, it is possible to make the video evaluation device 10 in the modification example of the first embodiment have the same functional configuration as that of the video evaluation device 140 in the first embodiment by integrating the amount of displacement detection section 101 and the feature value calculation section 102 into an amount of change detection section.

Second Embodiment

Figure 7:
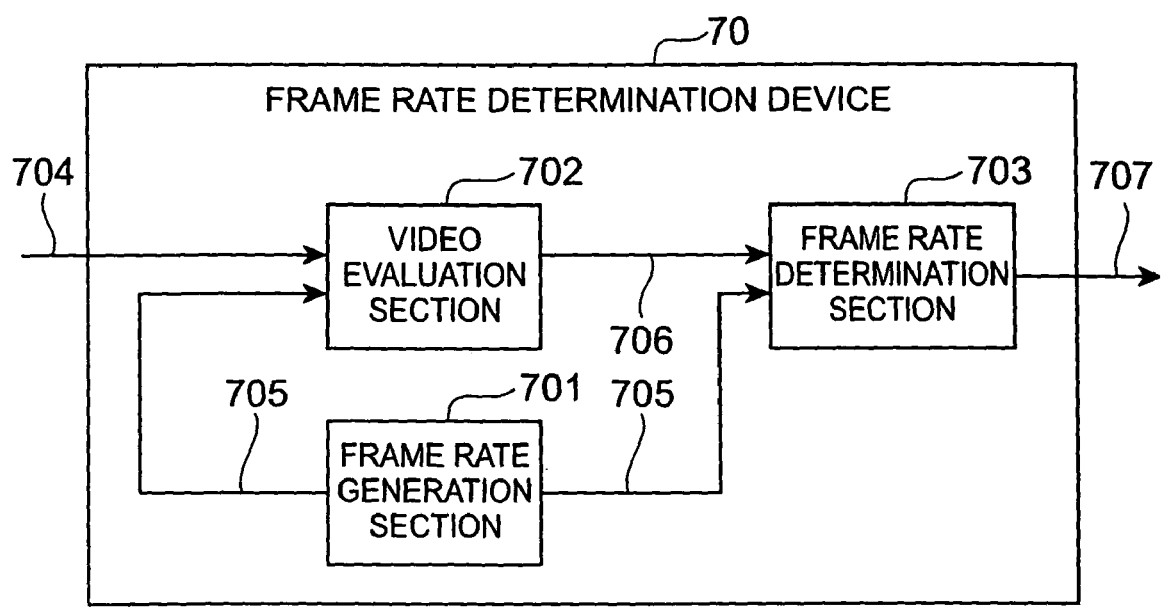
FIG. 7 is a diagram illustrating a functional configuration of frame rate determination device in a second embodiment.

Next, a second embodiment of the present invention is explained. FIG. 7 is a diagram illustrating a functional configuration of frame rate determination device 70 in the second embodiment.

Here, the frame rate determination device 70 is physically a computer comprising a CPU (Central Processing Unit), storage units such as memory, communication devices, etc. Therefore, the frame rate determination device 70 may be a fixed communication terminal such as PC terminal or may be a mobile communication terminal such as mobile phone. In other words, as the frame rate determination device 70, device capable of processing information can be applied widely.

The functional configuration of the frame rate determination device 70 is explained with reference to FIG. 7. As shown in FIG. 7, the frame rate determination device 70 comprises a frame rate generation section 701, a video evaluation section 702, and a frame rate determination section 703.

The frame rate generation section 701 generates a first frame rate 705. The frame rate generation section 701 outputs the generated first frame rate 705 to the video evaluation section 702 and the frame rate determination section 703.

The video evaluation section 702 has the same function as that possessed by the video evaluation device 140 described in the above-mentioned first embodiment or that possessed by the video evaluation device 10 described in the modification example of the first embodiment. In other words, the video evaluation section 702 has the same function as that possessed by the above-mentioned amount of change detection section 1401 and the evaluation value calculation section 1402 or that possessed by the amount of displacement detection section 101, the feature value calculation section 102, and the evaluation value calculation section 103.

The video evaluation section 702 reads frame pictures at the time intervals in accordance with the first frame rate 705 from an input video signal 704 input as a moving picture signal from the outside and calculates an evaluation value 706 of the smoothness in movement for the entire input video signal 704. The video evaluation section 702 outputs the calculated evaluation value 706 of the smoothness in movement to the frame rate determination section 703.

Figure 8:
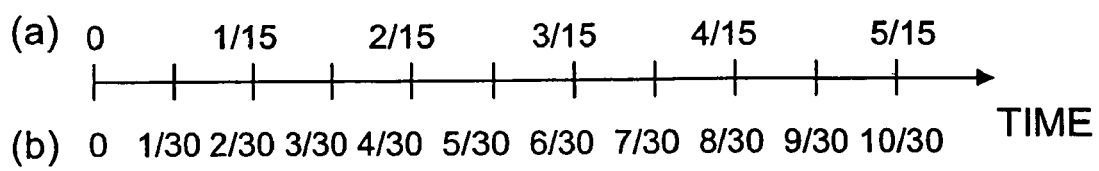
FIG. 8 (*a*) illustrates a first frame rate and (*b*) is a diagram illustrating a sampling rate of an input video signal.

Here, there is no problem with the first frame rate 705 even if it differs from the sampling rate of the input video signal 704. For example, while the first frame rate 705 shown in FIG. 8 (a) is 1/15 sec, the sampling rate of the input video signal 704 shown in FIG. 8 (b) is 1/30 sec.

The frame rate determination section 703 determines a second frame rate 707 based on the evaluation value 706 received from the video evaluation section 702 and the first frame rate 705 received from the frame rate generation section 701. The frame rate determination section 703 outputs the determined second frame rate 707 to the frame rate determination device 70 as a frame rate for carrying out the process of the input video signal 704.

This is explained specifically. When, for example, the evaluation value 706 is greater than a predetermined set value, the frame rate determination section 703 decreases the second frame rate 707 lower than the first frame rate 705. When, for example, the evaluation value 706 is less than the predetermined set value, the frame rate determination section 703 increases the second frame rate 707 higher than the first frame rate 705. When, for example, the evaluation value 706 is equal to the predetermined set value, the frame rate determination device 70 makes the second frame rate 707 equal to the first frame rate 705.

With this, it is possible to determine a second frame rate such that the evaluation value for evaluating the smoothness in movement of a video falls within a predetermined evaluation criterion range. In other words, it is possible to read an input video signal while keeping the smoothness in movement of a video within a predetermined criterion range. The above-mentioned predetermined set value may be set in advance or given from the outside.

Figure 9:
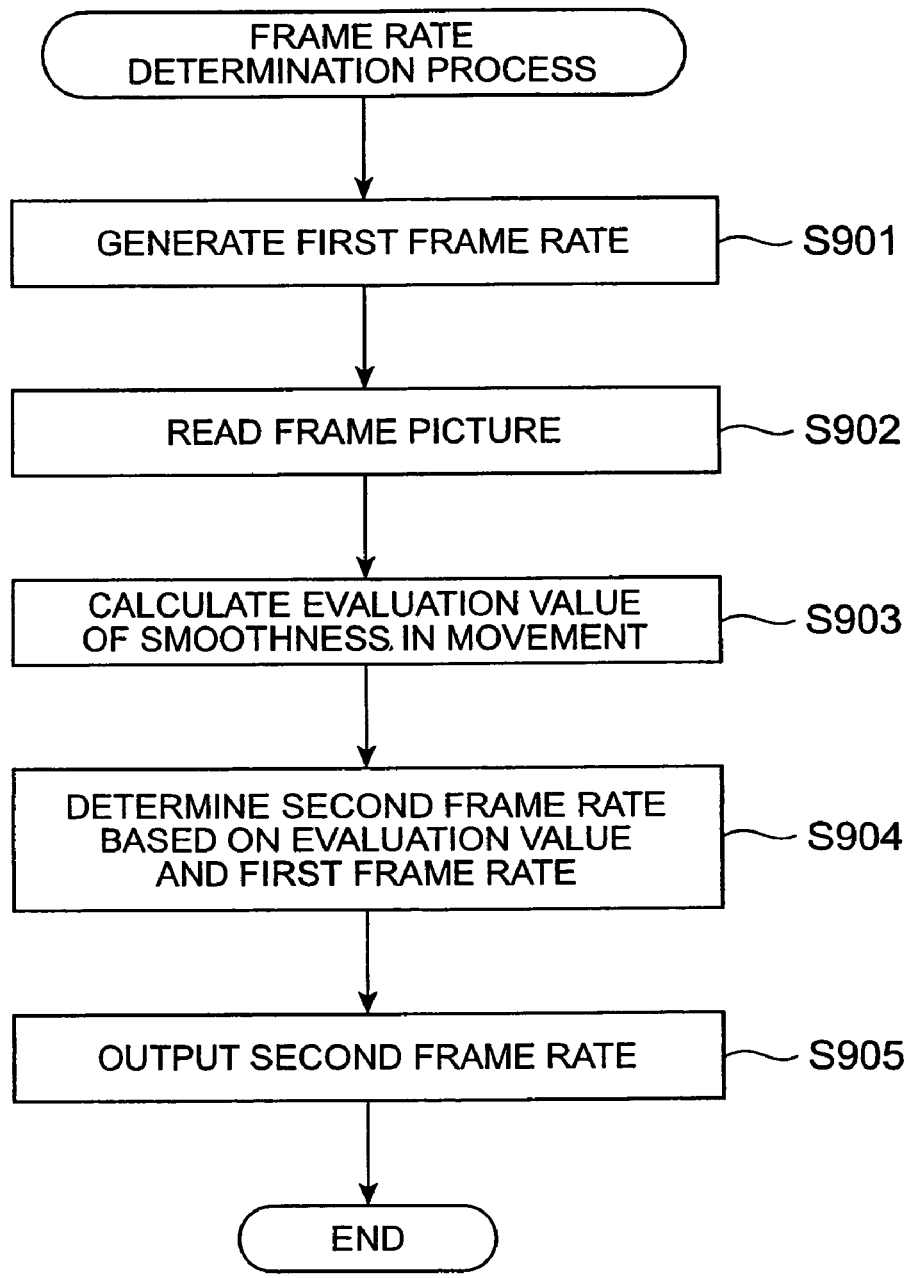
FIG. 9 is a flow chart showing a flow of a frame rate determination process in the second embodiment.

Next, the flow of a frame rate determination process in the frame rate determination device 70 of the second embodiment is explained with reference to FIG. 9.

First, the frame rate generation section 701 generates the first frame rate 705 (step S901).

Next, the video evaluation section 702 reads frame pictures at the time intervals in accordance with the first frame rate 705 from the input video signal 704 (step S902).

Next, the video evaluation section 702 calculates the evaluation value 706 of the smoothness in movement for the entire input video signal 704 based on each frame picture (step S903). In other words, the video evaluation section 702 calculates the evaluation value 706 of the smoothness in movement for the entire input video signal 704 by carrying out, based on each frame picture, the video evaluation processes from step S1701 to step S1707 explained in the above-mentioned first embodiment (refer to FIG. 17) or the video evaluation processes from step S401 to step S410 explained in the above-mentioned modification example of the first embodiment (refer to FIG. 4).

Next, the frame rate determination section 703 determines the second frame rate 707 based on the evaluation value 706 received from the video evaluation section 702 and the first frame rate 705 received from the frame rate generation section 701 (step S904).

Next, the frame rate determination section 703 outputs the second frame rate 707 to the outside as a frame rate for carrying out the process of the input video signal 704 (step S905).

As described above, according to the frame rate determination device 70 of the second embodiment, the evaluation value for evaluating the smoothness in movement of the input video signal is calculated based on the amount of change in the input video signal and the time interval between frame pictures based on the first frame rate and the second frame rate for carrying out the process of the input video signal is determined using the evaluation value. In other words, the smoothness in movement of the video at the first frame rate is evaluated in accordance with the amount of change in the input video signal input according to the first frame rate and at the same time, the second frame rate is determined using the evaluation.

Further, the movement vector is detected based on the plurality of frame pictures included in the input video signal and the movement feature value is calculated based the magnitude of the movement vector. Then, the evaluation value for evaluating the smoothness in movement of the input video signal is calculated based on the movement feature value and the time interval between frame pictures based on the first frame rate and the second frame rate for carrying out the process of the input video signal is determined using the evaluation value. In other words, the smoothness in movement of the video at the first frame rate is evaluated in accordance with the movement feature value of the input video signal input according to the first frame rate and at the same time, the second frame rate is determined using the evaluation.

Therefore, it is possible to read the input video signal while maintaining the smoothness in movement of a video as well as determining a frame rate of the input video signal in accordance with the smoothness in movement of the video.

Finally, a frame rate determination program 100 for causing a computer to function as the above-mentioned frame rate determination device 70 is explained with reference to FIG. 10.

Figure 10:
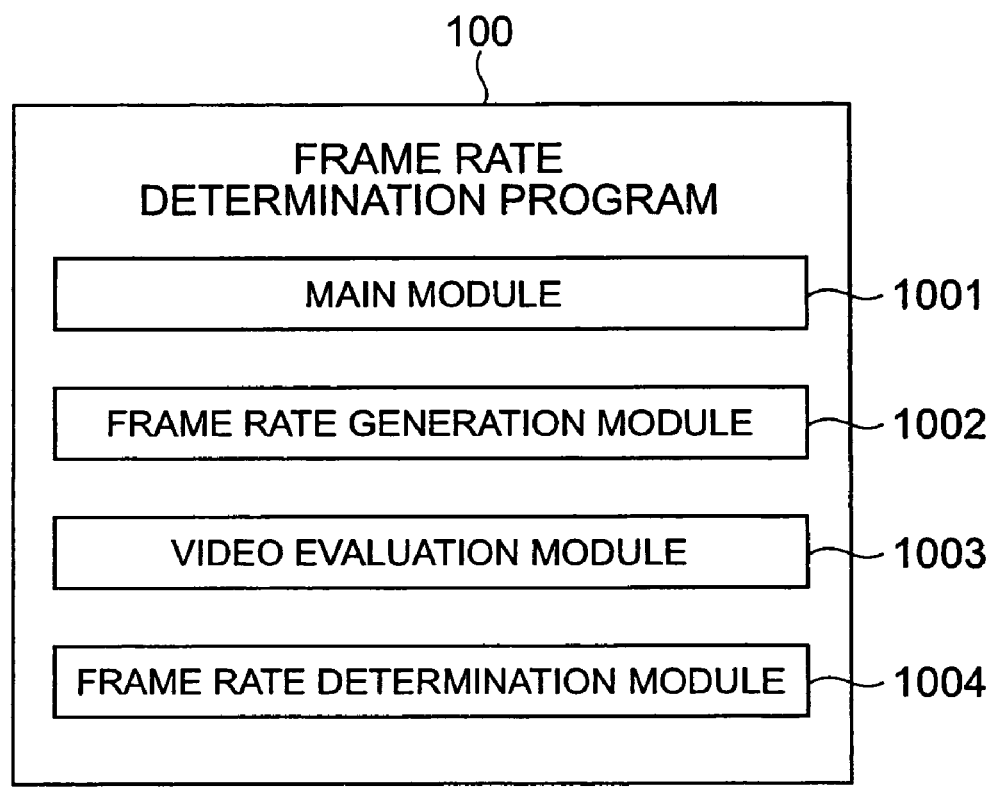
FIG. 10 is a diagram illustrating a module configuration of a frame rate determination program in the second embodiment.

As shown in FIG. 10, the frame rate determination program 100 comprises a main module program 1001 for generalizing processes, a frame rate generation module 1002, a video evaluation module 1003, and a frame rate determination module 1004. The functions that the frame rate generation module 1002, the video evaluation module 1003, and the frame rate determination module 1004 cause a computer to carry out are the same as those possessed by the above-mentioned frame rate generation section 701, the video evaluation section 702, and the frame rate determination section 703.

The frame rate determination program 100 is provided by, for example, storage media such as CD-ROM, DVD, and ROM or semiconductor memories. It may also be possible for the frame rate determination program 100 to be provided via a network as a computer data signal multiplexed on carriers.

Third Embodiment

Figure 11:
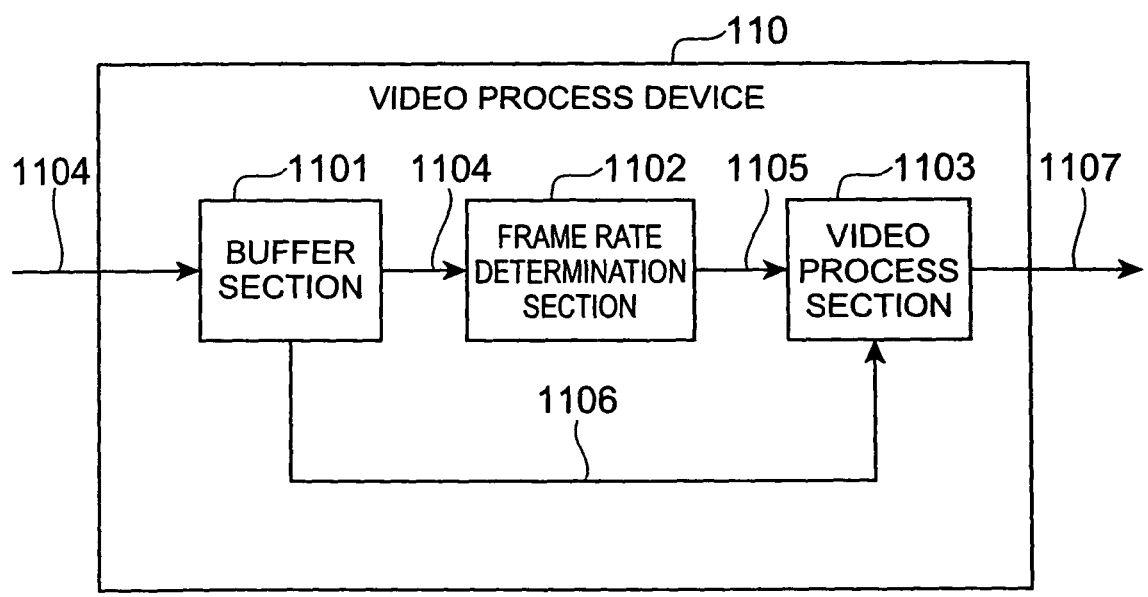
FIG. 11 is a diagram illustrating a functional configuration of video process device in a third embodiment.

Next, a third embodiment is explained. FIG. 11 is a diagram illustrating a functional configuration of video process device 110 in the third embodiment.

Here, the video process device 110 is physically a computer comprising a CPU (Central Processing Unit), storage units such as memory, communication devices, etc. Therefore, the video process device 110 may be a fixed communication terminal such as PC terminal or may be a mobile communication terminal such as mobile phone. In other words, as the video process device 110, device capable of processing information can be applied widely.

The functional configuration of the video process device 110 is explained with reference to FIG. 11. As shown in FIG. 11, the video process device 110 has a buffer section 1101, a frame rate determination section 1102, and a video process section 1103.

The buffer section 1101 temporarily stores an input video signal 1104 input from the outside as a moving picture signal in the buffer on the memory. The buffer section 1101 outputs the input video signal 1104 to the frame rate determination section 1102. The input video signal 1104 temporarily stored in the buffer is read as a process video signal 1106 by the video process section 1103, which will be described later.

The frame rate determination section 1102 has the same function as that possessed by the frame rate determination device 70 described in the above-mentioned second embodiment. In other words, the frame rate determination section 1102 has the same function as that possessed by the above-mentioned frame rate generation section 701, the video evaluation section 702, and the frame rate determination section 703. The frame rate determination section 1102 calculates a video process frame rate 1105 corresponding to the above-mentioned second frame rate 707 using the input video signal 1104 received from the buffer section 1101. The frame rate determination section 1102 outputs the calculated video process frame rate 1105 to the video process section 1103.

The video process section 1103 reads the process video signal 1106 from the buffer section 1101 at the time intervals in accordance with the video process frame rate 1105 and carries out the video process based on the process video signal 1106. This is explained specifically. The video process section 1103 reads only the frame pictures at the times corresponding to the video process frame rate 1105 received from the frame rate determination section 1102 among the frame pictures included in the process video signal 1106 stored in the buffer section 1101 and carries out the video process. The video process section 1103 outputs the video generated by the video process to the outside. To the video process carried out by the video process section 1103, for example, acquisition, storing, transmission, encoding, and decoding of videos correspond.

Figure 12:
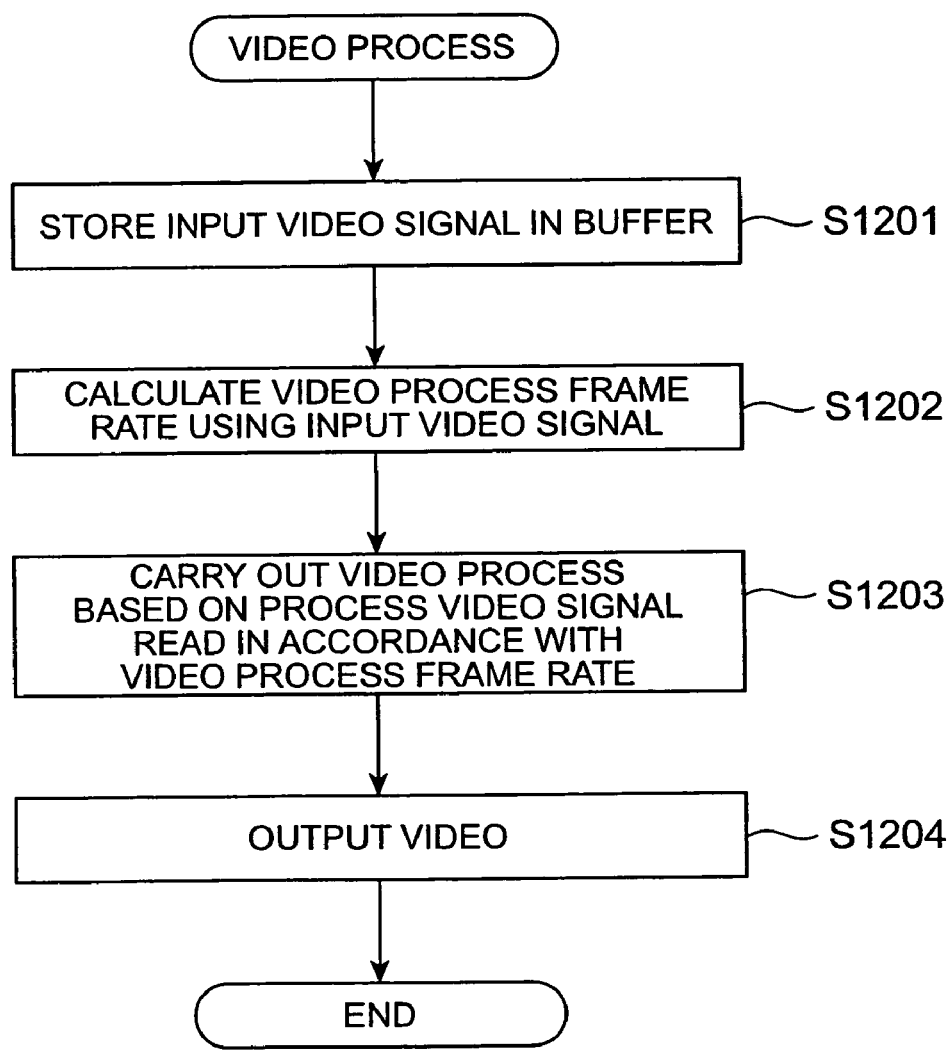
FIG. 12 is a flow chart showing a flow of a video process in the third embodiment.

Next, the flow of a video process in the video process device 110 in the third embodiment is explained with reference to FIG. 12.

First, the buffer section 1101 outputs the input video signal 1104 input from the outside as a moving picture signal to the frame rate determination section 1102 and at the same time, temporarily stores the input video signal 1104 in the buffer on the memory (step S1201).

Next, the frame rate determination section 1102 calculates the video process frame rate 1105 using the input video signal 1104 received from the buffer section 1101 (step S1202). In other words, the frame rate determination section 1102 calculates the video process frame rate 1105, which is a second frame rate, by carrying out the frame rate determination processes from step S901 to step S905 explained in the above-mentioned second embodiment using the input video signal 1104 (refer to FIG. 9).

Next, the video process section 1103 reads the process video signal 1106 from the buffer section 1101 at the time intervals in accordance with the video process frame rate 1105 and carries out the video process based on the process video signal 1106 (step S1203).

Next, the video process section 1103 outputs the video generated by the video process to the outside (step S1204).

As described above, according to the video process device 110 in the third embodiment, the evaluation value for evaluating the smoothness in movement of the input video signal is calculated based on the amount of change in the input video signal and the time interval between frame pictures based on the first frame rate and the second frame rate for carrying out the process of the input video signal is determined using the evaluation value. Then, the video process of the input video signal is carried out using the second frame rate. In other words, the smoothness in movement of the video at the first frame rate is evaluated in accordance with the amount of change in the input video signal input according to the first frame rate and at the same time, the second frame rate is determined using the evaluation. Then, the video process of the input video signal is carried out using the second frame rate determined based on the evaluation value for the input video signal.

Further, the movement vector is detected based on the plurality of frame pictures included in the input video signal and the movement feature value is calculated based on the magnitude of the movement vector. Then, the evaluation value for evaluating the smoothness in movement of the input video signal is calculated based on the movement feature value and the time interval between frame pictures based on the first frame rate and the second frame rate for carrying out the process of the input video signal is determined using the evaluation value. Further, the video process of the input video signal is carried out using the second frame rate. In other words, the smoothness in movement of the video at the first frame rate is evaluated in accordance with the movement feature value of the input video signal input according to the first frame rate and at the same time, the second frame rate is determined using the evaluation. Then, the video process of the input video signal is carried out using the second frame rate determined based on the evaluation value for the input video signal.

Therefore, it is possible to carry out the video process of the input video signal based on the second frame rate determined in accordance with the evaluation of the smoothness in movement. In other words, it is possible to carry out the video process of the input video signal while maintaining the smoothness in movement of the video as well as determining a frame rate in accordance with the smoothness in movement of the video.

The above-mentioned video process device 110 can be applied to, for example, video acquisition device (for example, camera), video transmission device, a video encoder, or a video decoder.

When the video process device 110 is applied to video acquisition device, each of the functions described above functions as follows. The buffer section 1101 buffers the input video signal 1104 input at a sampling rate (for example, 30 fps). The frame rate determination section 1102 calculates the optimum video process frame rate 1105 (for example, 15 fps) when the video acquisition device acquires a video using the input video signal 1104 received from the buffer section 1101 and outputs it to the video process section 1103. The video process section 1103 samples the input video signal 1104 stored in the buffer section 1101 using the video process frame rate 1105 (for example, 15 fps) received from the frame rate determination section 1102. The video process section 1103 acquires the process video signal 1106 obtained by sampling at the video process frame rate 1105 (for example, 15 fps).

When the video process device 110 is applied to video storing device, each of the functions described above functions as follows. The buffer section 1101 buffers the input video signal 1104 input at a sampling rate (for example, 30 fps). The frame rate determination section 1102 calculates the optimum video process frame rate 1105 (for example, 15 fps) when the video storing device stores a video using the input video signal 1104 received from the buffer section 1101 and outputs it to the video process section 1103. The video process section 1103 samples the input video signal 1104 stored in the buffer section 1101 using the video process frame rate 1105 (for example, 15 fps) received from the frame rate determination section 1102. The video process section 1103 stores the process video signal 1106 obtained by sampling at the video process frame rate 1105 (for example, 15 fps).

When the video process device 110 is applied to video transmission device, each of the functions described above functions as follows. The buffer section 1101 buffers the input video signal 1104 input at a sampling rate (for example, 30 fps). The frame rate determination section 1102 calculates the optimum video process frame rate 1105 (for example, 15 fps) when the video transmission device transmits a video using the input video signal 1104 received from the buffer section 1101 and outputs it to the video process section 1103. The video process section 1103 samples the input video signal 1104 stored in the buffer section 1101 using the video process frame rate 1105 (for example, 15 fps) received from the frame rate determination section 1102. The video process section 1103 transmits the process video signal 1106 obtained by sampling at the video process frame rate 1105 (for example, 15 fps).

When the video process device 110 is applied to a video encoder, each of the functions described above functions as follows. The buffer section 1101 buffers the input video signal 1104 input at a sampling rate (for example, 30 fps). The frame rate determination section 1102 calculates the optimum video process frame rate 1105 (for example, 15 fps) when the video encoder encodes a video using the input video signal 1104 received from the buffer section 1101 and outputs it to the video process section 1103. The video process section 1103 samples the input video signal 1104 stored in the buffer section 1101 using the video process frame rate 1105 (for example, 15 fps) received from the frame rate determination section 1102. The video process section 1103 encodes the process video signal 1106 obtained by sampling at the video process frame rate 1105 (for example, 15 fps).

When the video process device 110 is applied to a video decoder, each of the functions described above functions as follows. The buffer section 1101 buffers the input video signal 1104 input at a sampling rate (for example, 30 fps). The frame rate determination section 1102 calculates the optimum video process frame rate 1105 (for example, 15 fps) when the video decoder decodes a video using the input video signal 1104 received from the buffer section 1101 and outputs it to the video process section 1103. The video process section 1103 samples the input video signal 1104 stored in the buffer section 1101 using the video process frame rate 1105 (for example, 15 fps) received from the frame rate determination section 1102. The video process section 1103 decodes the process video signal 1106 obtained by sampling at the video process frame rate 1105 (for example, 15 fps).

Finally, a video process program 130 for causing a computer to function as the above-mentioned video process device 110 is explained with reference to FIG. 13.

Figure 13:
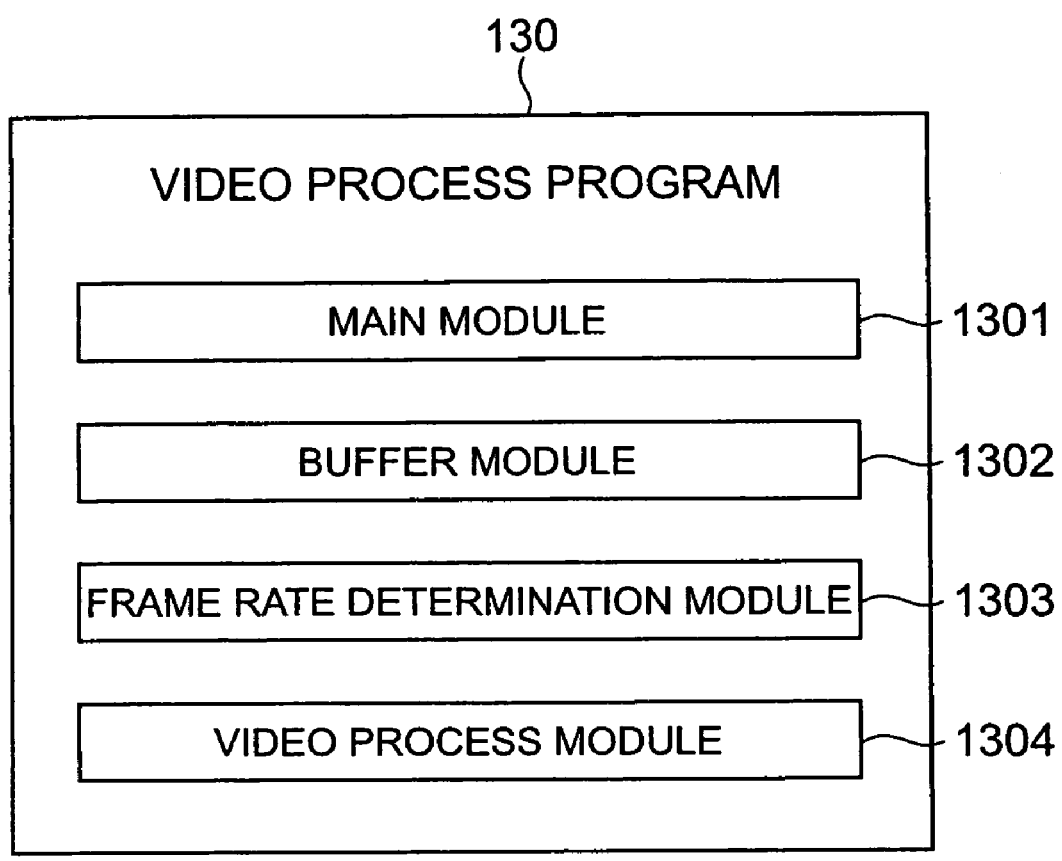
FIG. 13 is a diagram illustrating a module configuration of a video process program in the third embodiment.

As shown in FIG. 13, the video process program 130 comprises a main module program 1301 for generalizing processes, a buffer module 1302, a frame rate determination module 1303, and a video process module 1304. The functions that the buffer module 1302, the frame rate determination module 1303, and the video process module 1304 cause a computer to carry out are the same as those possessed by the above-mentioned buffer section 1101, the frame rate determination section 1102, and the video process section 1103.

The video process program 130 is provided by, for example, storage media such as CD-ROM, DVD, and ROM or semiconductor memories. It may also be possible for the video process program 130 to be provided via a network as a computer data signal multiplexed on carriers.

What is claimed is:

1. A frame rate determination device comprising:
a frame rate generation section configured to generate a first frame rate;
an amount of change detection section configured to detect, based on a plurality of frame pictures included in an input video signal, an amount of change that indicates the degree of change between each of the frame pictures;
an evaluation value calculation section configured to calculate an evaluation value relating to the smoothness in movement of the input video signal based on the amount of change and the time interval between frame pictures in accordance with the first frame rate; and
a frame rate determination section configured to determine a second frame rate for carrying out a process on the input video signal using the evaluation value and outputting the second frame rate.

2. The frame rate determination device according to claim 1, wherein the evaluation value calculation section is configured to compute an amount of change in time in accordance with the amount of change and the time interval between each of the frame pictures based on the amount of change and the time interval between each of the frame pictures and calculate the evaluation value using the amount of change in time.

3. The frame rate determination device according to claim 1, wherein the amount of change is a value based on a difference in luminance value between each of the frame pictures.

4. The frame rate determination device according to claim 1, wherein the amount of change is a movement vector between each of the frame pictures.

5. The frame rate determination device according to claim 1, further comprising a feature value calculation section configured to calculate a movement feature value that indicates the feature of movement of the input video signal based on the amount of change, wherein the evaluation value calculation section is configured to calculate the evaluation value based on the movement feature value and the time interval between each of the frame pictures.

6. The frame rate determination device according to claim 5, wherein the evaluation value calculation section is configured to compute an amount of change in time in accordance with the amount of change and the time interval between each of the frame pictures based on the movement feature value and the time interval between each of the frame pictures and calculate the evaluation value using the amount of change in time.

7. The frame rate determination device according to claim 5, wherein:
the amount of change is a movement vector between each of the frame pictures; and
the movement feature value is a value calculated based on the magnitude of the movement vector.

8. The frame rate determination device according to claim 1, wherein the frame rate determination section is configured to compare the evaluation value with a predetermined set value and set the second frame rate smaller than the first frame rate if the evaluation value is greater than the predetermined set value, and set the second frame rate greater than the first frame rate when the evaluation value is smaller than the predetermined set value.

9. A video process device comprising:
a buffer configured to store an input video signal;
a frame rate generation section configured to generate a first frame rate;
an amount of change detection section configured to detect, based on a plurality of frame pictures included in the input video signal, an amount of change that indicates the degree of change between each of the frame pictures;
an evaluation value calculation section configured to calculate an evaluation value relating to the smoothness in movement of the input video signal based on the amount of change and the time interval between frame pictures in accordance with the first frame rate;
a frame rate determination section configured to determine a second frame rate for carrying out the process of the input video signal using the evaluation value; and
a video process section configured to read the input video signal stored in the buffer using the second frame rate and carry out the video process.

10. The video process device according to claim 9, wherein the frame rate determination section is configured to compare the evaluation value with a predetermined set value and set the second frame rate smaller than the first frame rate if the evaluation value is greater than the predetermined set value, and set the second frame rate greater than the first frame rate when the evaluation value is smaller than the predetermined set value.

11. A frame rate determination method performed by a frame rate determination device, the frame rate determination method comprising:
generating, by a processor of the frame rate determination device, a first frame rate;
detecting, by the processor of the video evaluation device, based on a plurality of frame pictures included in an input video signal, an amount of change that indicates the degree of change between each of the frame pictures; and
calculating, by the processor of the video evaluation device, an evaluation value relating to the smoothness in movement of the input video signal based on the amount of change and the time interval between frame pictures in accordance with the first frame rate; and
determining, by the processor of the video evaluation device, a second frame rate for carrying out a process on the input video signal using the evaluation value and outputting the second frame rate.

12. The frame rate determination method according to claim 11, wherein the determining includes comparing the evaluation value with a predetermined set value and setting the second frame rate smaller than the first frame rate if the evaluation value is greater than the predetermined set value, and setting the second frame rate greater than the first frame rate when the evaluation value is smaller than the predetermined set value.

13. A non-transitory computer-readable medium including computer program instructions, which when executed by a computer, cause the computer to perform a frame rate determination method comprising:
generating a first frame rate;
detecting, based on a plurality of frame pictures included in an input video signal, an amount of change that indicates the degree of change between each of the frame pictures; and
calculating an evaluation value relating to the smoothness in movement of the input video signal based on the amount of change and the time interval between the frame pictures in accordance with the first frame rate; and
determining a second frame rate for carrying out a process on the input video signal using the evaluation value and outputting the second frame rate.

14. The non-transitory computer readable medium according to claim 13, wherein the determining includes comparing the evaluation value with a predetermined set value and setting the second frame rate smaller than the first frame rate if the evaluation value is greater than the predetermined set value, and setting the second frame rate greater than the first frame rate when the evaluation value is smaller than the predetermined set value.

* * * * *